United States Patent
Lee et al.

(10) Patent No.: US 12,445,911 B2
(45) Date of Patent: Oct. 14, 2025

(54) METHOD FOR TRANSMITTING AND RECEIVING SIGNAL IN WIRELESS COMMUNICATION SYSTEM, AND APPARATUS FOR SUPPORTING SAME

(71) Applicant: LG ELECTRONICS INC., Seoul (KR)

(72) Inventors: Jeongsu Lee, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 261 days.

(21) Appl. No.: 17/925,523

(22) PCT Filed: Jun. 10, 2021

(86) PCT No.: PCT/KR2021/007263
§ 371 (c)(1),
(2) Date: Nov. 15, 2022

(87) PCT Pub. No.: WO2021/251765
PCT Pub. Date: Dec. 16, 2021

(65) Prior Publication Data
US 2023/0199596 A1     Jun. 22, 2023

(30) Foreign Application Priority Data

Jun. 10, 2020     (KR) .................. 10-2020-0069976

(51) Int. Cl.
*H04W 36/00*     (2009.01)
*H04W 36/18*     (2009.01)

(52) U.S. Cl.
CPC .... *H04W 36/0011* (2013.01); *H04W 36/0077* (2013.01); *H04W 36/185* (2023.05)

(58) Field of Classification Search
CPC ............ H04W 36/00; H04W 36/0011; H04W 36/185; H04W 36/0077
See application file for complete search history.

(56) References Cited

U.S. PATENT DOCUMENTS

| | | | |
|---|---|---|---|
| 2019/0297549 A1 | 9/2019 | Suzuki et al. | |
| 2020/0107277 A1* | 4/2020 | Jeon ...................... | H04W 52/36 |
| 2020/0314773 A1* | 10/2020 | Hsieh .................. | H04W 52/346 |

FOREIGN PATENT DOCUMENTS

WO     2019097470 A1     5/2019

OTHER PUBLICATIONS

R1-2003890: Samsung, 3GPP TSG RAN WG1 #101-e, e-Meeting May 25-Jun. 5, 2020; "Remaining issues for IR Mobility Enhancement," May 15, 2020; (9 Pages) (Year: 2020).*

(Continued)

*Primary Examiner* — Jinsong Hu
*Assistant Examiner* — Farideh Madani
(74) *Attorney, Agent, or Firm* — BRYAN CAVE LEIGHTON PAISNER LLP

(57) ABSTRACT

Disclosed are a method for transmitting and receiving signals in a wireless communication system, and an apparatus supporting the method, wherein dual active protocol stack-based handover (DAPS HO) operation is carried out, and, on the basis of transmission, to a target master cell group, of a message comprising a physical random access channel (PRACH) and a physical uplink shared channel (PUSCH), an uplink signal different from the message is not transmitted to a source MCG in a first time period that overlaps with a second time period in which PRACH and PUSCH were transmitted.

8 Claims, 21 Drawing Sheets

(56) References Cited

OTHER PUBLICATIONS

R1-2003890: Samsung, 3GPP TSG RAN WG1 #101-e, e-Meeting May 25-Jun. 5, 2020; "Remaining issues for NR Mobility Enhancement," May 15, 2020; (9 Pages).

R2-1907733: Huawei, HiSilicon, 3GPP TSG-RAN WG2 Meeting #106, Reno, Nevada, US Apr. 13-May 17, 2019, "RACH type switching between 2-steps, 4-steps RACH and CFRA," (8 Pages).

\* cited by examiner

FIG. 5
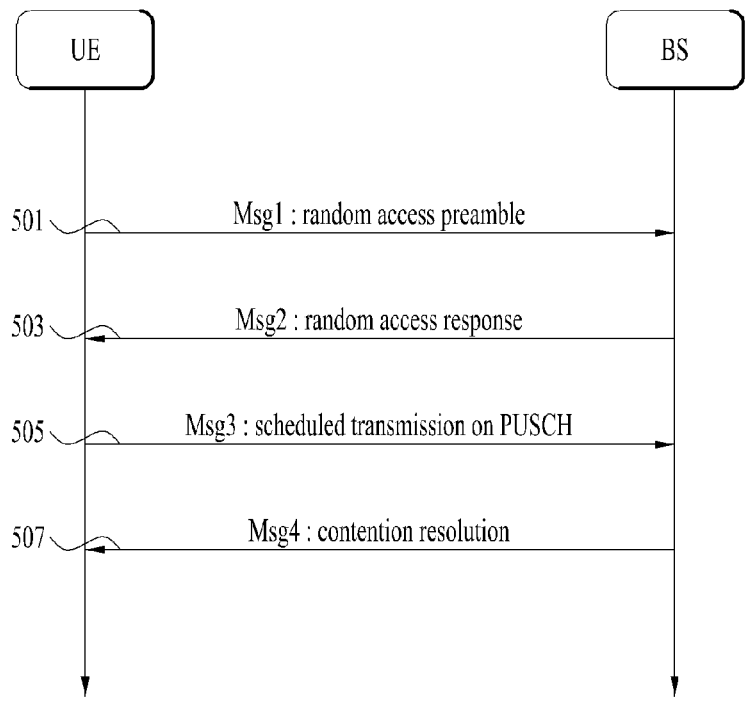
(a)
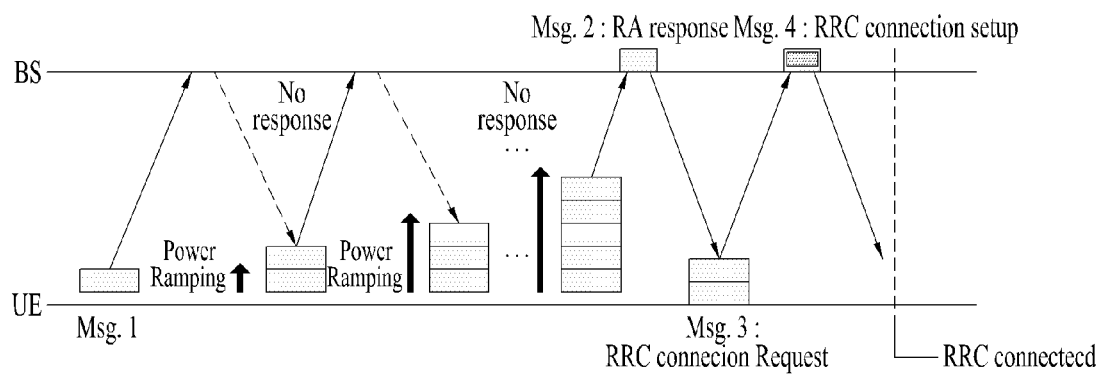
(b)

METHOD FOR TRANSMITTING AND RECEIVING SIGNAL IN WIRELESS COMMUNICATION SYSTEM, AND APPARATUS FOR SUPPORTING SAME

This application is the National Stage filing under 35 U.S.C. 371 of International Application No. PCT/KR2021/007263 filed on Jun. 10, 2021, which claims priority to Korean Patent Application No. 10-2020-0069976 filed on Jun. 10, 2020, the contents of which are all hereby incorporated by reference herein in their entirety.

TECHNICAL FIELD

Various embodiments are related to a wireless communication system.

BACKGROUND

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

SUMMARY

Various embodiments may provide a method and apparatus for transmitting and receiving a signal in a wireless communication system.

Various embodiments may provide an operation method and an apparatus supporting the same when a type-2 random access procedure is used in a DAPSHO operation It will be appreciated by persons skilled in the art that the objects that could be achieved with the present disclosure are not limited to what has been particularly described hereinabove and the above and other objects that the present disclosure could achieve will be more clearly understood from the following detailed description.

Various embodiments may provide a method and apparatus for transmitting and receiving a signal in a wireless communication system.

According to various embodiments, a method performed by a user equipment (UE) in a wireless communication system may be provided.

According to various embodiments, the method may include receiving configuration information related to a dual active protocol stack based handover (DAPS HO) operation, providing a source master cell group (MCG) and a target MCG for the DAPS HO operation to the user equipment, and performing the DAPS HO operation based on the configuration information, According to various embodiments, based on transmitting a message A including a physical random access channel (PRACH) and a physical uplink shared channel (PUSCH) to the target MCG in the DAPS HO operation, an uplink signal different from the message A may not be transmitted to the source MCG in a first time interval overlapping with a second time interval in which the PRACH and PUSCH included in the message A is transmitted.

According to various embodiments, the first time interval and the second time interval may correspond to a same one slot.

According to various embodiments, information to configure a type of a random access procedure performed in the DAPS HO operation may be received based on system information or a handover request According to various embodiments, based on the type of the random access procedure being configured as type 2, the message A may be transmitted to the target MCG in the random access procedure performed in the DAPS HO operation.

According to various embodiments, the uplink signal may be transmitted in a third time interval after the N symbols from a last symbol among symbols included in the first time interval.

According to various embodiments, the last symbol among the symbols included in the first time interval may be a last symbol among symbols to which the PUSCH included in the message A is mapped and the N may be a natural number.

According to various embodiments, based on the DAPS HO operation being a DAPS HO operation within a same frequency band, the uplink signal may not be transmitted to the source MCG in the first time interval.

According to various embodiments, based on the DAPS HO operation being a DAPS HO operation within a different frequency band and a comparison result between a total transmit power of uplink transmissions and a maximum transmit power of the UE, a transmission power is allocated to the uplink transmissions based on preconfigured priorities, According to various embodiments, the uplink transmissions may include a transmission of the message A and a transmission of the uplink signal According to various embodiments, within the priorities, a priority of the PRACH included in the message A may be higher than a priority of the PUSCH included in the message A.

According to various embodiments, a user equipment (UE) configured to operate in a wireless communication system may be provided.

According to various embodiments, the UE may include a transceiver, and at least one processor coupled with the transceiver.

According to various embodiments, the one or more processors may be configured to receive configuration information related to a dual active protocol stack based handover (DAPS HO) operation, provide a source master cell group (MCG) and a target MCG for the DAPS HO operation to the user equipment, and perform the DAPS HO operation based on the configuration information.

According to various embodiments, based on transmitting a message A including a physical random access channel (PRACH) and a physical uplink shared channel (PUSCH) to the target MCG in the DAPS HO operation, an uplink signal different from the message A may not be transmitted to the source MCG in a first time interval overlapping with a second time interval in which the PRACH and PUSCH included in the message A is transmitted.

According to various embodiments, the first time interval and the second time interval may correspond to a same one slot.

According to various embodiments, wherein information to configure a type of a random access procedure performed in the DAPS HO operation may be received based on system information or a handover request.

According to various embodiments, based on based on the type of the random access procedure being configured as type 2, the message A may be transmitted to the target MCG in the random access procedure performed in the DAPS HO operation.

According to various embodiments, the uplink signal may be transmitted in a third time interval after the N symbols from a last symbol among symbols included in the first time interval.

According to various embodiments, the last symbol among the symbols included in the first time interval may be a last symbol among symbols to which the PUSCH included in the message A is mapped, and the N may be a natural number.

According to various embodiments, the at least one processor may be configured to communicate with at least one of a UE, a network, and an autonomous vehicle other than a vehicle in which the UE is included.

According to various embodiments, a method performed by a base station in a wireless communication system may be provided.

According to various embodiments, the method may include transmitting configuration information related to a dual active protocol stack based handover (DAPS HO) operation, wherein the base station corresponds to a source master cell group (MCG) among the source MCG and a target MCG for the DAPS HO operation and performing the DAPS HO operation based on the configuration information.

According to various embodiments, based on transmitting a message A including a physical random access channel (PRACH) and a physical uplink shared channel (PUSCH) to the target MCG in the DAPS HO operation, an uplink signal different from the message A may not be transmitted to the source MCG in a first time interval overlapping with a second time interval in which the PRACH and PUSCH included in the message A is transmitted.

According to various embodiments, a base station operating in a wireless communication system may be provided.

According to various embodiments, the base station may include a transceiver, and at least one processor coupled with the transceiver.

According to various embodiments, the one or more processors may be configured to transmit configuration information related to a dual active protocol stack based handover (DAPS HO) operation, wherein the base station corresponds to a source master cell group (MCG) among the source MCG and a target MCG for the DAPS HO operation and perform the DAPS HO operation based on the configuration information.

According to various embodiments, based on transmitting a message A including a physical random access channel (PRACH) and a physical uplink shared channel (PUSCH) to the target MCG in the DAPS HO operation, an uplink signal different from the message A may not be transmitted to the source MCG in a first time interval overlapping with a second time interval in which the PRACH and PUSCH included in the message A is transmitted.

According to various embodiments, an apparatus operating in a wireless communication system may be provided.

According to various embodiments, the apparatus may include at least one processor, and at least one memory storing at least one instruction to cause the at least one processor to perform a method.

According to various embodiments, the operation may include receiving configuration information related to a dual active protocol stack based handover (DAPS HO) operation, providing a source master cell group (MCG) and a target MCG for the DAPS HO operation to a user equipment, and performing the DAPS HO operation based on the configuration information.

According to various embodiments, based on transmitting a message A including a physical random access channel (PRACH) and a physical uplink shared channel (PUSCH) to the target MCG in the DAPS HO operation, an uplink signal different from the message A may not be transmitted to the source MCG in a first time interval overlapping with a second time interval in which the PRACH and PUSCH included in the message A is transmitted.

According to various embodiments, a processor-readable medium storing at least one instruction to cause at least one processor to perform a method may be provided.

According to various embodiments, the operation may include receiving configuration information related to a dual active protocol stack based handover (DAPS HO) operation, providing a source master cell group (MCG) and a target MCG for the DAPS HO operation to a user equipment, and performing the DAPS HO operation based on the configuration information.

According to various embodiments, based on transmitting a message A including a physical random access channel (PRACH) and a physical uplink shared channel (PUSCH) to the target MCG in the DAPS HO operation, an uplink signal different from the message A may not be transmitted to the source MCG in a first time interval overlapping with a second time interval in which the PRACH and PUSCH included in the message A is transmitted.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

According to various embodiments, a signal may be effectively transmitted and received in a wireless communication system.

According to various embodiments, when a type-2 random access procedure is used in a DAPS HO operation, a method of operating a User Equipment/Base Station (UE/BS) may be clearly provided.

According to various embodiments, latency may be reduced.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 5 is a diagram illustrating an exemplary 4-step random access channel (RACH) procedure to which type 2various embodiments are applicable.

DETAILED DESCRIPTION

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-1-DMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, such documents as GPP TS 37.213, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331 and the like may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
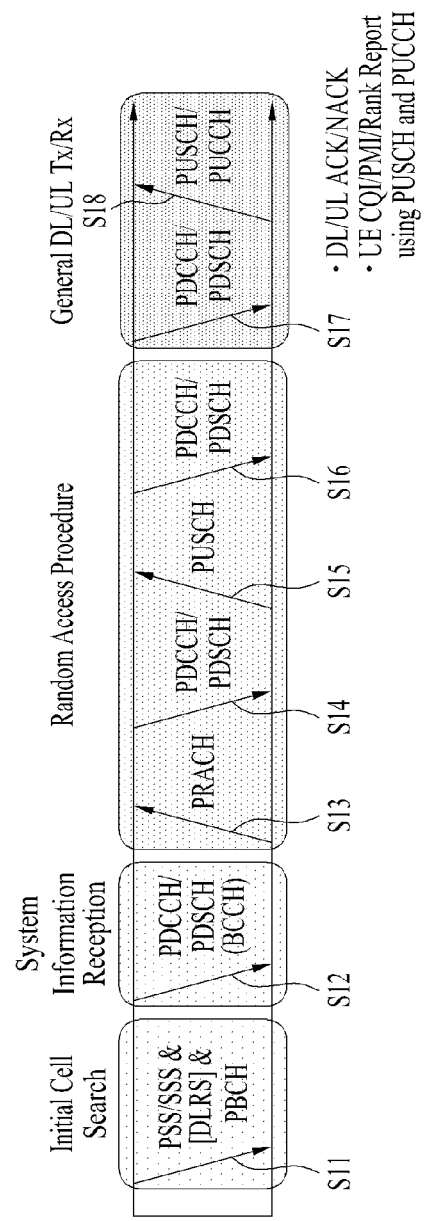
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structure

Figure 2:
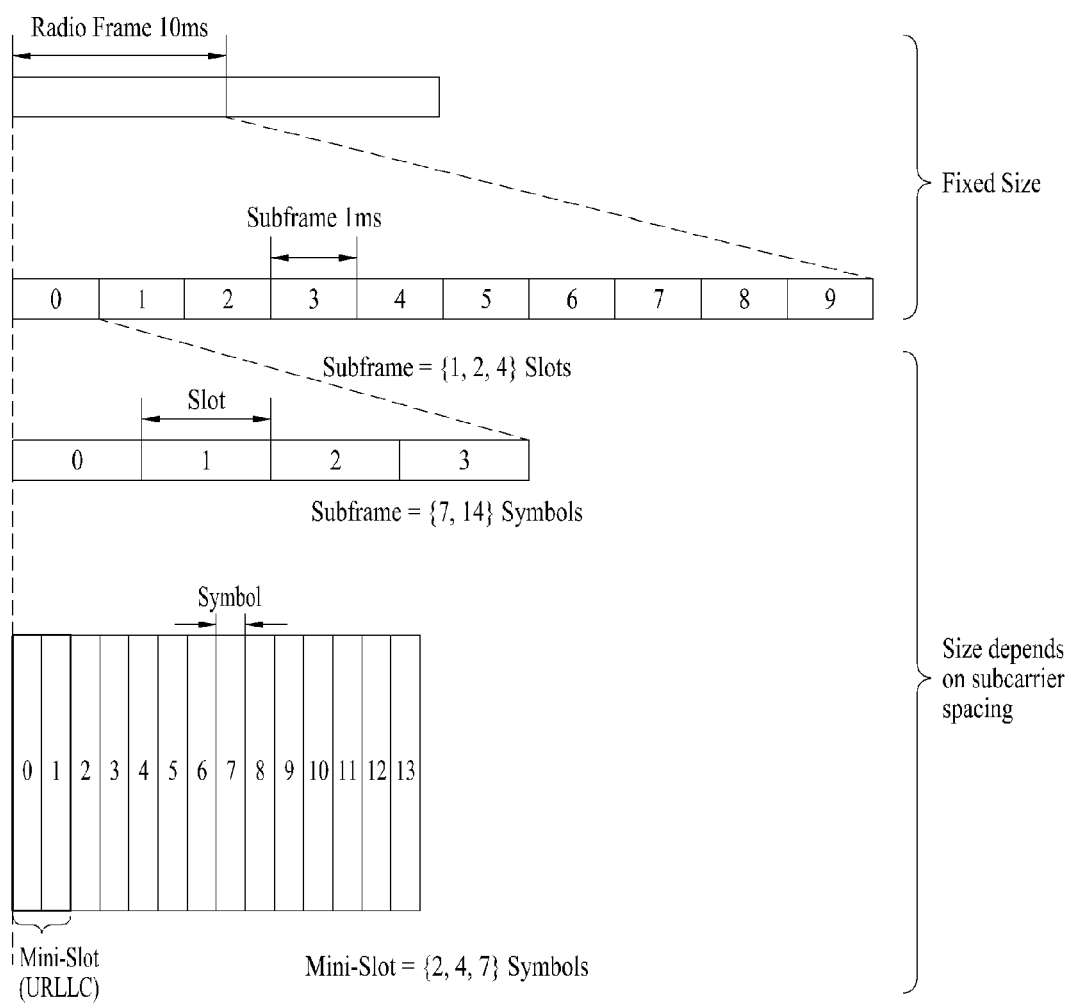
FIG. 2 is a diagram illustrating a radio frame structure in a new radio access technology (NR) system to which type 2various embodiments are applicable.

FIG. 2 is a diagram illustrating a radio frame structure in a new radio access technology (NR) system to which type 2various embodiments are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $Tc=1/(\Delta fmax*Nf)$ where $\Delta fmax=480*10^3$ Hz and a value Nf related to a fast Fourier transform (FFT) size or an inverse fast Fourier transform (IFFT) size is given as Nf=4096. Tc and Ts which is an LTE-based time unit and sampling time, given as $Ts=1/((15 kHz)*2048)$ are placed in the following relationship: Ts/Tc=64. DL and UL transmissions are organized into (radio) frames each having a duration of $Tf=(\Delta fmax*Nf/100)*Tc=10$ ms. Each radio frame includes 10 subframes each having a duration of $Tsf=(\Delta fmax*Nf/1000)*Tc=1$ ms. There may exist one set of frames for UL and one set of frames for DL. For a numerology μ, slots are numbered with $n\mu s \in \{0, \ldots, Nslot,\mu subframe-1\}$ in an increasing order in a subframe, and with $n\mu s, f \in \{0, \ldots, Nslot,\mu frame-1\}$ in an increasing order in a radio frame. One slot includes Nμsymb consecutive OFDM symbols, and Nμsymb depends on a CP. The start of a slot nμs in a subframe is aligned in time with the start of an OFDM symbol nμs*Nμsymb in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which type 2various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
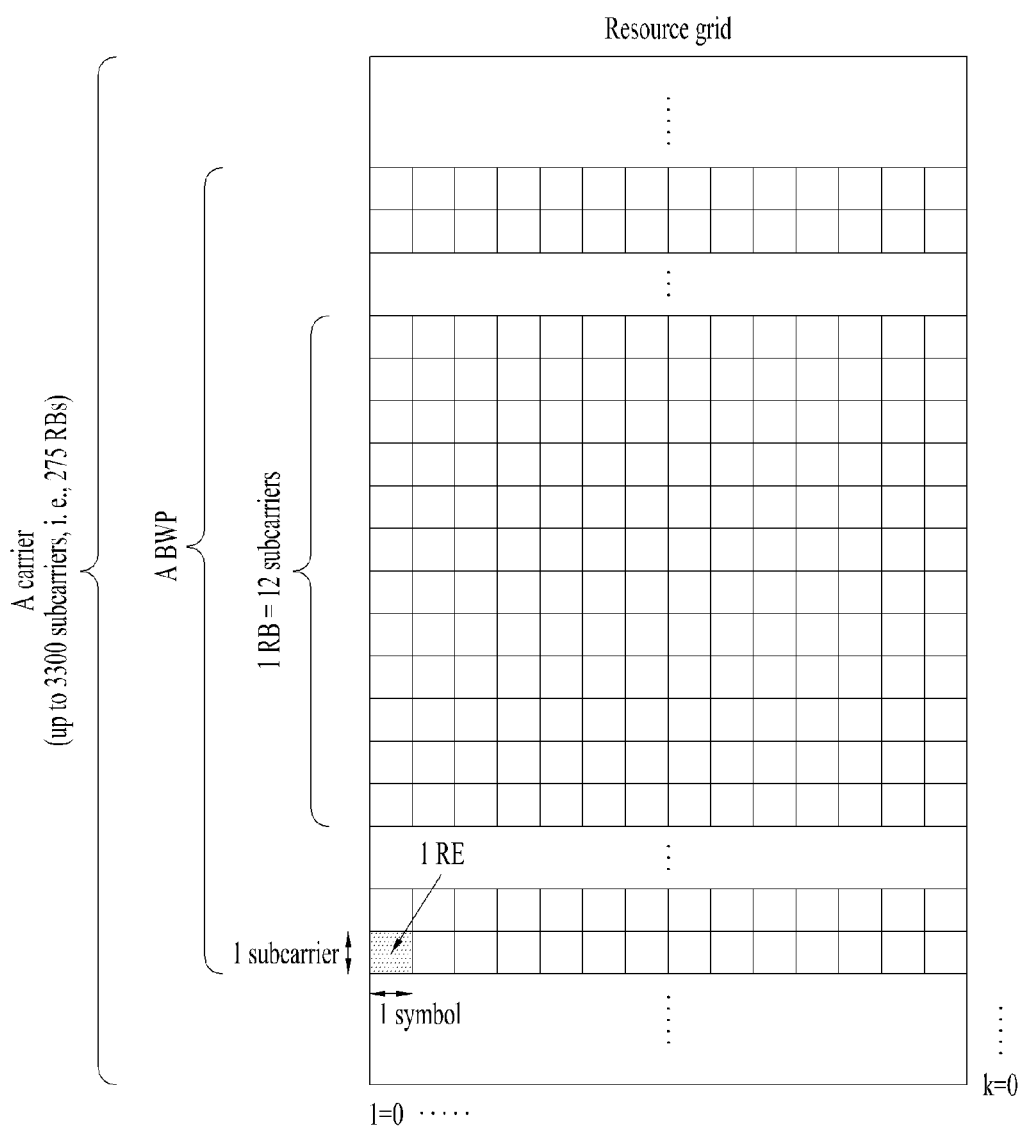
FIG. 3 is a diagram illustrating a slot structure in an NR system to which type 2various embodiments are applicable.

FIG. 3 is a diagram illustrating a slot structure in an NR system to which type 2various embodiments are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A BWP, which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
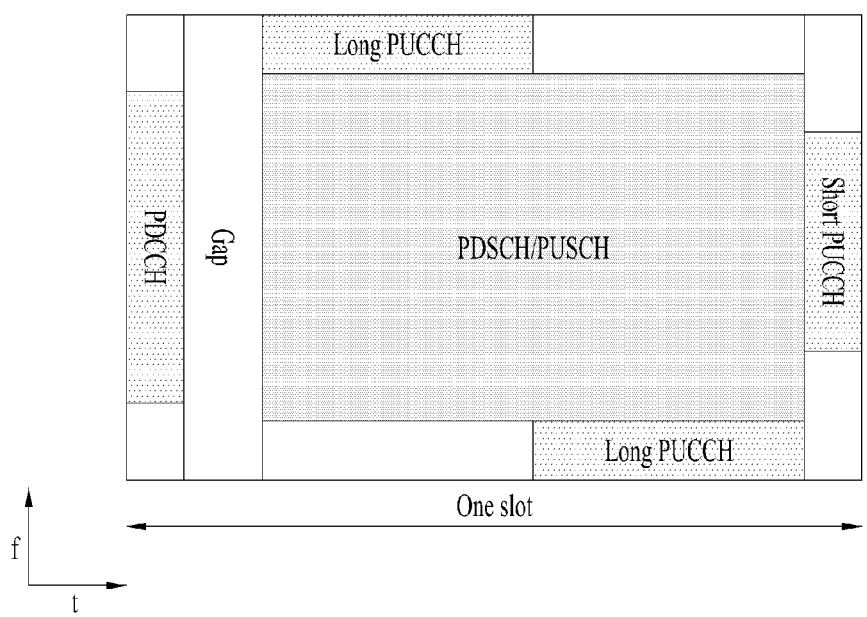
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

1.3. Channel Structures

1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an ACK/NACK information for DL data, channel state information (CSI), a scheduling request (SR), and so on.

The PDCCH carries DCI and is modulated in QPSK. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration.

Table 5 lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |

TABLE 5-continued

| Type | Search Space | RNTI | Use Case |
|---|---|---|---|
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | <2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Carrier Aggregation, (CA)

NR may support a wider uplink/downlink bandwidth by aggregating a plurality of uplink/downlink carriers (i.e., carrier aggregation). Through carrier aggregation, it may be possible to transmit/receive signals on multiple carriers. When carrier aggregation is applied, each carrier may be referred to as a component carrier (CC). CCs may or may not be adjacent to each other in the frequency domain. A bandwidth of each of the CC may be independently determined. Asymmetrical carrier aggregation with UL CCs and DL CCs, the numbers of which are different, is possible. In NR, radio resources may be classified/managed by cells, and a cell may include one DL CC and 0 to 2 UL CCs. For example, a cell may include (i) only one DL CC, (ii) one DC CC and one UL CC, or (ii) one DL CC and two UL CCs (including one supplementary UL CC). Cells may be classified as follows. In the description of various embodiments, a cell may be interpreted according to a context, and may mean, for example, a serving cell. In addition, unless otherwise described, operations according to various embodiments may be applied to each serving cell.

- Primary Cell (PCell): A cell operating at a primary frequency (e.g., Primary Component Carrier (PCC)) at which a UE performs an initial connection establishment procedure or initiates a connection re-establishment procedure when the UE is configured with carrier aggregation. A master cell group (MCG) cell operating at a primary frequency at which a UE performs an initial connection establishment procedure or initiates a connection re-establishment procedure in the case of Dual connectivity (DC).
- Secondary Cell (SCell): A cell that additionally provides a radio resource other than SpCell in the case of a UE configured with carrier aggregation.
- Primary SCG Cell/Primary Second Cell (PSCell): A Secondary Cell Group (SCG) cell in which a UE performs random access when RRC reconfiguration and synchronization are performed in the case of DC.
- Special Cell (SpCell): In the case of DC, the SpCell is a PCell of MCG or a PSCell of SCG. Otherwise (i.e., non-DC), the SpCell is a PCell.
- Serving cell (ServCell): This is a cell configured in a UE in an RRC_CONNECTED state. When CA/DC is not configured, only one serving cell (i.e., PCell) is present. When CA/DC is configured, the serving cell is a cell set including SpCell (s) and all SCells.

Control information may be configured to be transmitted and received only through a specific cell. For example, UCI may be transmitted only through a SpCell (e.g., PCell). When an SCell (hereinafter, a PUCCH-SCell) in which PUCCH transmission is allowed is configured, UCI may also be transmitted through the PUCCH-SCell. In another example, a BS may allocate a scheduling cell (set) to reduce the complexity of PDCCH blinding decoding (BD) at a UE side. For PDSCH reception/PUSCH transmission, the UE may perform PDCCH detection/decoding only in a scheduling cell. In addition, the BS may transmit the PDCCH only through the scheduling cell (set). For example, the PDCCH for downlink assignment may be transmitted in cell #0 (i.e., a scheduling cell), and the corresponding PDSCH may be transmitted in cell #2 (i.e., a scheduled (scheduled) cell) (Cross-Carrier Scheduling (CCS)). The scheduling cell (set) may be configured in a UE-specific, UE-group-specific or cell-specific manner. The scheduling cell may include an SpCell (e.g., a PCell).

For CCS, a carrier indicator field (CIF) may be used. The CIF may be semi-static and may be disabled/enabled via UE-specific (or UE-group-specific) higher layer (e.g., Radio Resource Control (RRC)) signaling. The CIF field may be an x-bit field (e.g., x=3) in the PDCCH (i.e., DCI) and may be used to indicate a (serving) cell index of the scheduled cell.

- CIF disabled/inactivated: There is no CIF in the PDCCH. The PDCCH on a scheduling cell may allocate PDSCH/PUSCH resources on the same cell. That is, the scheduling cell may be the same as the scheduled cell.
- CIF enabled/activated: There is a CIF in a PDCCH. The PDCCH on scheduling may allocate PDSCH/PUSCH resource on one cell among a plurality of cells using the CIF. The scheduling cell may be the same as or different from the scheduled cell. PDSCH/PUSCH may mean a PDSCH or a PUSCH.

2. Random Access Procedure (RACH)

When a UE initially accesses a BS or has no radio resources for a signal transmission, the UE may perform a random access procedure with the BS.

The random access procedure is used for various purposes. For example, the random access procedure may be used for initial network access in an RRC_IDLE state, an RRC connection reestablishment procedure, handover, UE-triggered UL data transmission, transition in an RRC_INACTIVE state, time alignment establishment in SCell addition, OSI request, and beam failure recovery. The UE may acquire UL synchronization and UL transmission resources in the random access procedure.

The random access procedure is classified into a contention-based random access procedure and a contention-free random access procedure. The contention-based random access procedure is classified into a 4-step random access procedure (4-step RACH) and a 2-step random access procedure (2-step RACH).

2.1. 4-Step RACH: Type-1 Random Access Procedure

FIG. 5 is a diagram illustrating an exemplary 4-step RACH procedure to which type 2various embodiments are applicable.

When the (contention-based) random access procedure is performed in four steps (4-step RACH procedure), the UE may transmit a message (Message 1 (Msg1)) including a preamble related to a specific sequence on a PRACH (501) and receive a PDCCH and a response message (RAR message) (Message 2 (Msg2)) for the preamble on a PDSCH corresponding to the PDCCH (503). The UE transmits a message (Message 3 (Msg3)) including a PUSCH based on scheduling information included in the RAR (505) and perform a contention resolution procedure involving reception of a PDCCH signal and a PDSCH signal corresponding to the PDCCH signal. The UE may receive a message (Message 4 (Msg4)) including contention resolution information for the contention resolution procedure from the BS (507).

The 4-step RACH procedure of the UE may be summarized in Table 8 below.

TABLE 8

| Type of Signals | | Operations/Information obtained |
|---|---|---|
| 1st step | PRACH preamble in UL | * Initial beam obtainment<br>* Random selection of RA-preamble ID |
| 2nd step | Random Access Response on DL-SCH | * Timing Advanced information<br>* RA-preamble ID<br>* Initial UL grant, Temporary C-RNTI |
| 3rd step | UL transmission on UL-SCH | * RRC connection request<br>* UE identifier |
| 4th step | Contention Resolution on DL | * Temporary C-RNTI on PDCCH for initial access<br>* C-RNTI on PDCCH for UE in RRC_CONNECTED |

In the random access procedure, the UE may first transmit an RACH preamble as Msg1 on a PRACH.

Random access preamble sequences of two different lengths are supported. The longer sequence length 839 is applied to the SCSs of 1.25 kHz and 5 kHz, whereas the shorter sequence length 139 is applied to the SCSs of 15 kHz, 30 kHz, 60 kHz, and 120 kHz.

Multiple preamble formats are defined by one or more RACH OFDM symbols and different CPs (and/or guard times). An RACH configuration for a cell is provided in system information of the cell to the UE. The RACH configuration includes information about a PRACH SCS, available preambles, and a preamble format. The RACH configuration includes information about associations between SSBs and RACH (time-frequency) resources. The UE transmits a RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit the RACH preamble in an RACH resource associated with the selected SSB. For example, when retransmitting the RACH preamble, the UE may reselect one of the SSBs and retransmit the RACH preamble in an RACH resource associated with the reselected SSB. That is, the RACH resource for the retransmission of the RACH preamble may be identical to and/or different from the RACH resource for the transmission of the RACH preamble.

Upon receipt of the RACH preamble from the UE, the BS transmits an RAR message (Msg2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive the RAR on the PDSCH scheduled by DCI carried on the PDCCH. The UE determines whether the RAR includes RAR information for its transmitted preamble, that is, Msg1. The UE may make the determination by checking the presence or absence of the RACH preamble ID of its transmitted preamble in the RAR. In the absence of the response to Msg1, the UE may retransmit the RACH preamble a predetermined number of or fewer times, while performing power ramping. The UE calculates PRACH transmission power for the preamble retransmission based on the latest pathloss and a power ramping counter.

The RAR information may include a preamble sequence transmitted by the UE, a temporary cell RNTI (TC-RNTI) that the BS has allocated to the UE attempting random access, UL transmit time alignment information, UL transmission power adjustment information, and UL radio resource allocation information. Upon receipt of its RAR information on a PDSCH, the UE may acquire time advance information for UL synchronization, an initial UL grant, and a TC-RNTI. The timing advance information is used to control a UL signal transmission timing. For better alignment between a PUSCH/PUCCH transmission of the UE and a subframe timing of a network end, the network (e.g., the BS) may measure the time difference between a PUSCH/PUCCH/SRS reception and a subframe and transmit the timing advance information based on the time difference. The UE may transmit a UL signal as Msg3 of the random access procedure on a UL-SCH based on the RAR information. Msg3 may include an RRC connection request and a UE ID. The network may transmit Msg4 in response to Msg3. Msg4 may be treated as a contention resolution message on DL. As the UE receives Msg4, the UE may enter an RRC_CONNECTED state.

As described before, the UL grant included in the RAR schedules a PUSCH transmission to the BS. A PUSCH carrying an initial UL transmission based on the UL grant of the RAR is referred to as an Msg3 PUSCH. The content of the RAR UL grant starts from the most significant bit (MSB) and ends in the least significant bit (LSB), given as Table 9.

TABLE 9

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A transmit power control (TPC) command is used to determine the transmission power of the Msg3 PUSCH. For example, the TPC command is interpreted according to Table 10.

TABLE 10

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

2.2. 2-Step RACH: Type-2 Random Access Procedure

Figure 6:
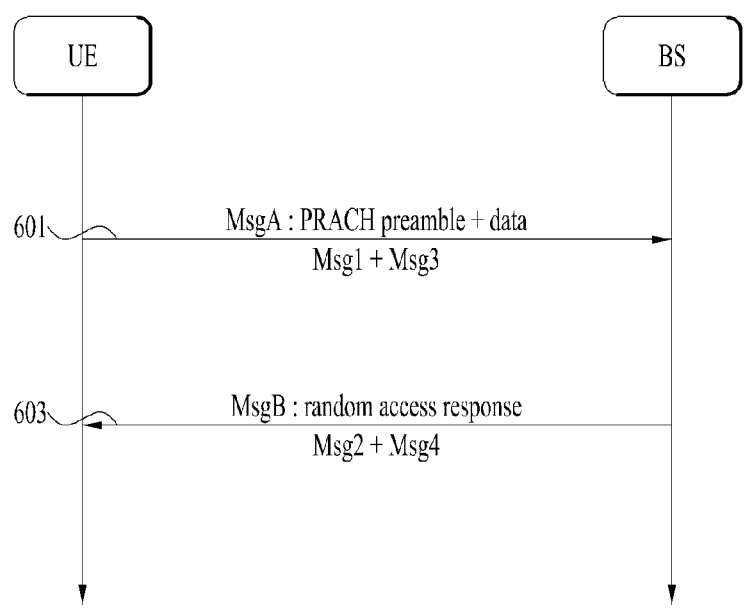
FIG. 6 is a diagram illustrating an exemplary 2-step RACH procedure to which type 2various embodiments are applicable.

FIG. 6 is a diagram illustrating an exemplary 2-step RACH procedure to which type 2various embodiments are applicable.

The (contention-based) RACH procedure performed in two steps, that is, the 2-step RACH procedure has been proposed to simplify the RACH procedure and thus achieve low signaling overhead and low latency.

In the 2-step RACH procedure, the operation of transmitting Msg1 and the operation of transmitting Msg3 in the 4-step RACH procedure may be incorporated into an operation of transmitting one message, Message A (MsgA) including a PRACH and a PUSCH by the UE. The operation of transmitting Msg2 by the BS and the operation of transmitting Msg4 by the BS in the 4-step RACH procedure may be incorporated into an operation of transmitting one message, Message B (MsgB) including an RAR and contention resolution information.

That is, in the 2-step RACH procedure, the UE may combine Msg1 and Msg3 of the 4-step RACH procedure into one message (e.g., MsgA) and transmit the message to the BS (601).

Further, in the 2-step RACH procedure, the BS may combine Msg2 and Msg4 of the 4-step RACH procedure into one message (e.g., MsgB) and transmit the message to the UE (603).

The 2-step RACH procedure may become a low-latency RACH procedure based on the combinations of these messages.

More specifically, MsgA may carry a PRACH preamble included in Msg1 and data included in Msg3 in the 2-step RACH procedure. In the 2-step RACH procedure, MsgB may carry an RAR included in Msg2 and contention resolution information included in Msg4.

2.3. Contention-Free RACH

Figure 7:
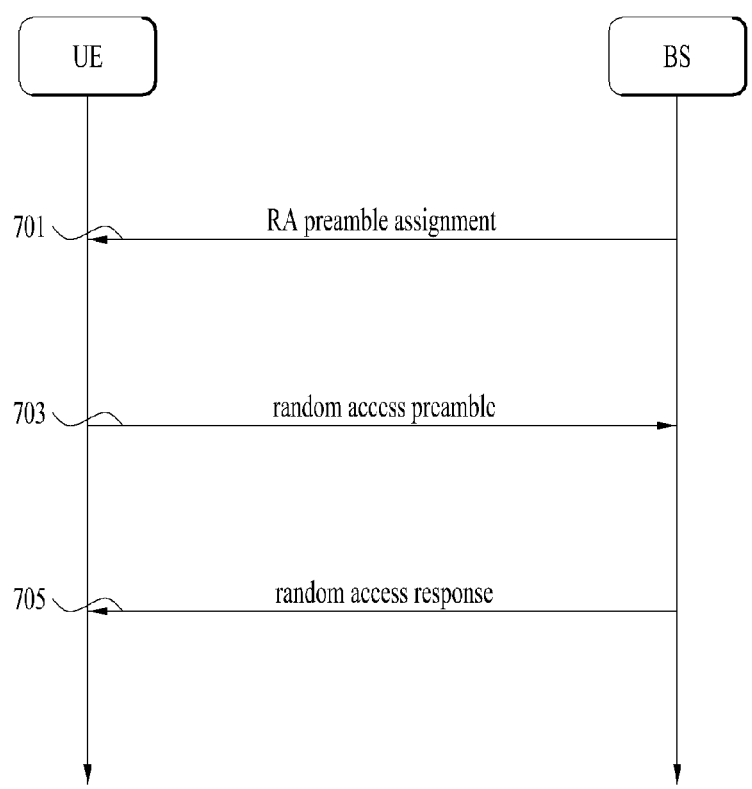
FIG. 7 is a diagram illustrating a contention-free RACH procedure to which type 2various embodiments are applicable.

FIG. 7 is a diagram illustrating an exemplary contention-free RACH procedure to which type 2various embodiments are applicable.

The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure (1901). Information about the dedicated RACH preamble may be included in an RRC message (e.g., a handover command) or provided to the UE by a PDCCH order. When the RACH procedure starts, the UE transmits the dedicated RACH preamble to the BS (1903). When the UE receives an RAR from the BS, the RACH procedure is completed (1905).

In the contention-free RACH procedure, a CSI request field in an RAR UL grant indicates whether the UE is to include an aperiodic CSI report in a corresponding PUSCH transmission. An SCS for the Msg3 PUSCH transmission is provided by an RRC parameter. The UE may transmit the PRACH and the Msg3 PUSCH in the same UL carrier of the same serving cell. A UL BWP for the Msg3 PUSCH transmission is indicated by SIB1.

2.4. Mapping Between SSB Blocks and PRACH Resource (Occasion)

Figure 8:
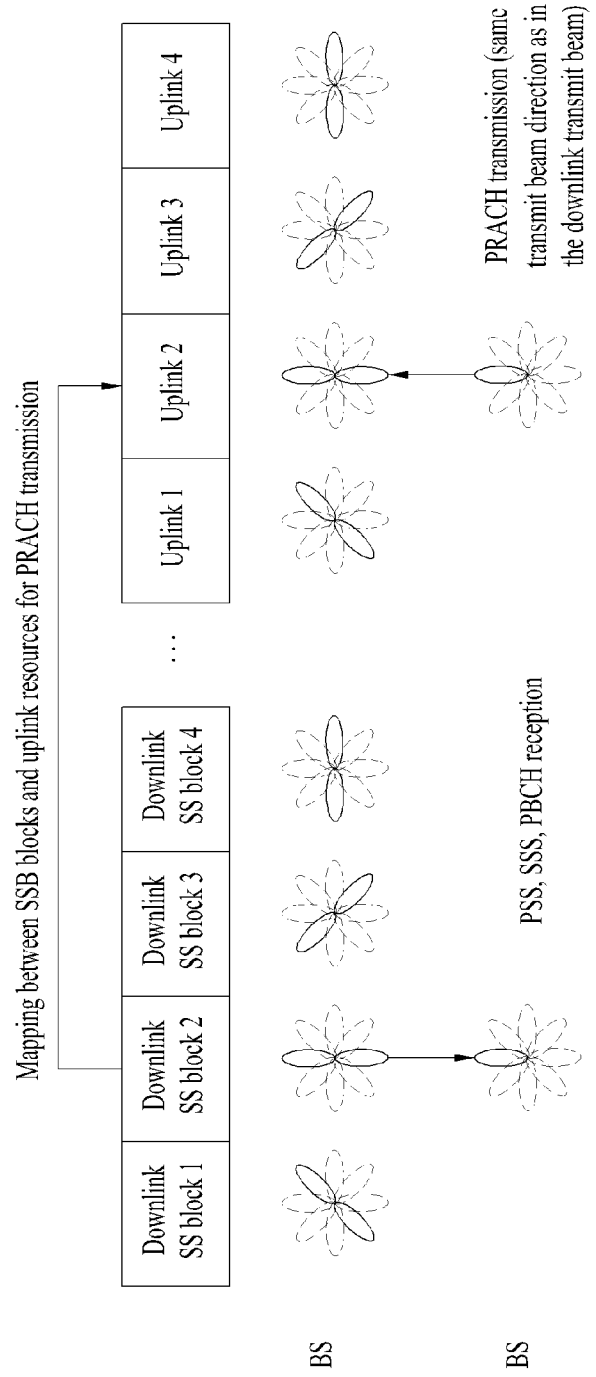
FIG. 8 is a diagram illustrating an example of transmission of an SS block and PRACH resources linked to the SS block according to type 2various embodiments.
Figure 9:
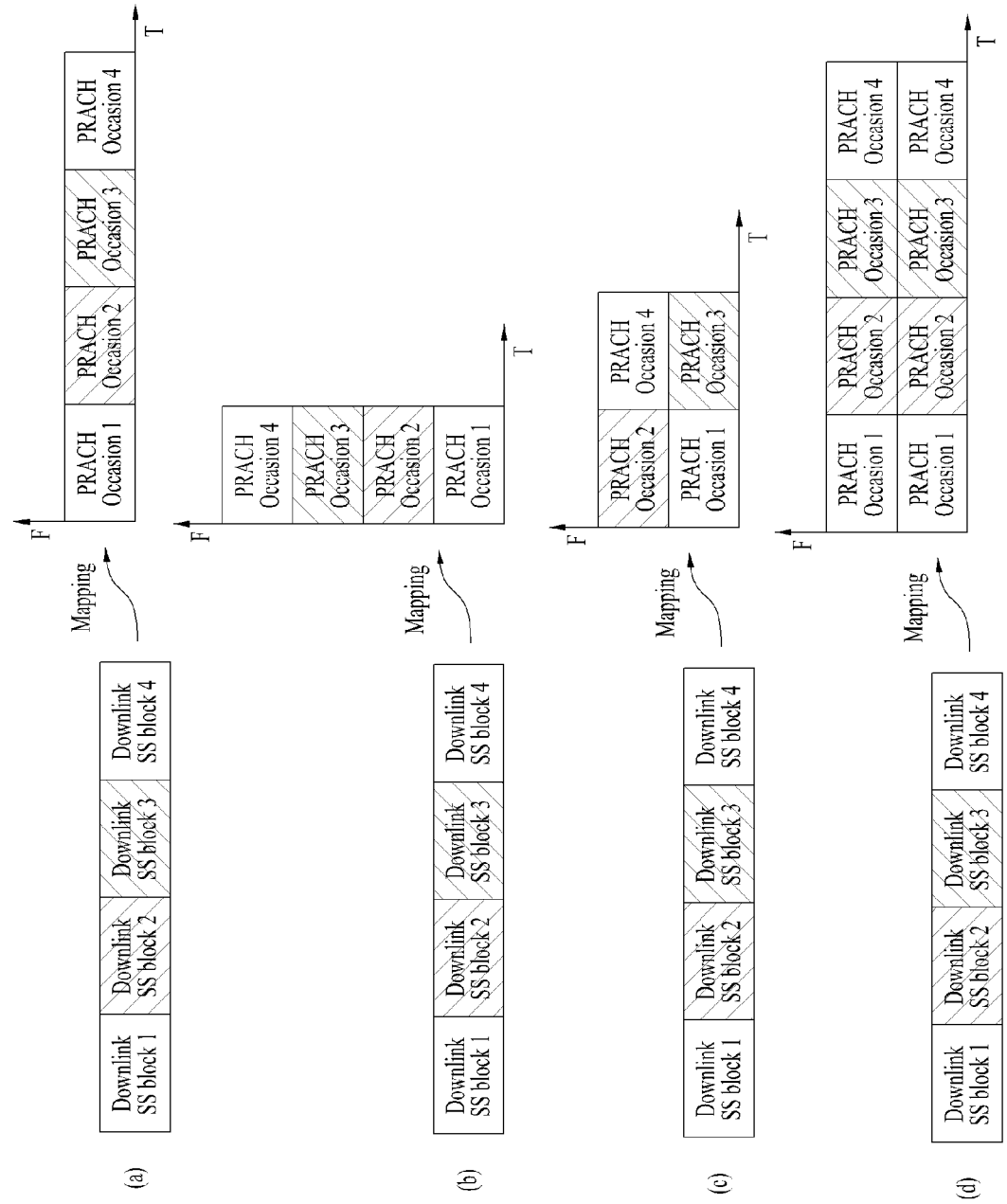
FIG. 9 is a diagram illustrating an example of transmission of an SS block and PRACH resources linked to the SS block according to type 2various embodiments.

FIGS. 8 and 9 are diagrams illustrating examples of transmission of an SS block and PRACH resources linked to the SS block according to type 2various embodiments.

In order for the BS to communicate with one UE, an optimum beam direction between the BS and the UE should be recognized, and the optimum beam direction may be changed according to UE movement, so that the optimum beam direction should be continuously tracked. A process for searching for the optimum beam direction between the BS and the UE is referred to as a beam acquisition process, and a process for continuously tracking the optimum beam direction is referred to as a beam tracking process. The beam acquisition process is required for 1) an initial access state in which the UE initially attempts to access the BS, for 2) a handover state where the UE is handed over from one BS to another BS, and for 3) a beam recovery state for recovering from a beam failure in which an optimum beam is lost during beam tracking between the UE and the BS so that an optimum communication state between the BS and the UE cannot be maintained or the BS and the UE cannot communicate with each other.

In the NR system, a multi-stage beam acquisition process for beam acquisition in the environment using multiple beams has been discussed. In the multi-stage beam acquisition process, the BS and the UE may perform a connection configuration using a wide beam in the initial access stage. After completion of the connection configuration, the BS and the UE may perform communication with an optimum quality using a narrow beam. In the NR system applicable to type 2various embodiments, one example of the beam acquisition process is as follows.

1) A process for searching for the BS is performed in a UE initial access step. That is, the BS may perform cell search or cell acquisition, may measure the channel quality for each beam of a wide beam, and may transmit a synchronization block for each wide beam to search for an optimum wide beam to be used in a primary step of beam acquisition.

2) The UE performs cell search for a synchronization block for each beam, and performs downlink beam acquisition using the detection result for each beam.

3) The UE performs an RACH process to inform the BS that the UE will access the BS.

4) In order to allow the UE to inform the BS of the downlink (DL) beam acquisition result (e.g., beam index) at a wide beam level concurrently with the RACH process, the BS may connect or associate a synchronization block transmitted for each beam to the PRACH resources to be used for PRACH transmission. When the UE performs the RACH procedure using the PRACH resources connected to the optimal beam direction found by the UE itself, the BS obtains information on a downlink (DL) beam suitable for the UE in the process of receiving the PRACH preamble.

In the multi-beam environment, information about whether the UE and/or the TRP can correctly determine a reception (Tx) beam direction and/or a reception (RX) beam direction between the UE and the TRP (transmission and reception point) is considered problematic. In the multi-beam environment, repetition of signal transmission or beam sweeping for signal reception may be performed according to Tx/Rx reciprocal capability of the TRP (e.g., BS) or the UE in the multi-beam environment. The Tx/Rx reciprocal capability may also be referred to as Tx/Rx beam correspondence at the TRP or the UE. If the Tx/Rx interaction is not valid (hold) at the TRP and the UE in the multi-beam environment, the UE may not shoot (send) the uplink (UL) signal in the beam direction along which the UE receives the downlink (DL) signal. This is because the optimum path on uplink may be different from the optimum path on downlink. If the TRP can determine the TRP Rx beam for the corresponding uplink reception based on downlink measurement of the UE related to one or more Tx beams of the TRP, or if the TRP can determine the TRP Tx beam for the corresponding downlink transmission based on uplink measurement of the TRP' related to one or more Tx beams of the TRP, the Tx/Rx beam correspondence at the TRP may be valid (hold). If the UE can determine the UE Rx beam for the corresponding uplink transmission based on downlink measurement of the UE related to one or more Tx beams of the UE, or if the UE can determine the UE Tx beam for the corresponding downlink reception on the basis of an indication of the TRP based on uplink measurement related to one or more Tx beams of the UE, Tx/Rx beam correspondence at the UE may be considered valid (hold).

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C

DAPS HO: Dual Active Protocol Stack (DAPS) handover. Unless otherwise stated, in the description of various embodiments, a DAPS HO operation may refer to one or more operations performed in a UE/BS (source BS/target BS) during a DAPS HO process. Unless particularly stated otherwise, in the description of various embodiments, a DAPS HO operation may be replaced with an operation related to a DAPS HO and/or an operation performed in the DAPS HO.

HO: handover

MCG: master cell group

SRS: Sounding Reference Signal. According to various embodiments, SRS may be used for UL channel estimation and positioning measurement using Multi Input Multi Output (MIMO). In other words, according to various embodiments, the SRS may include a normal SRS and a positioning SRS. According to various embodiments, the positioning SRS may be understood as a ULRS configured for positioning a UE and/or used for positioning the UE. According to various embodiments, the normal SRS is contrasted with the positioning SRS, and may be understood as a UL RS configured for UL channel estimation and/or used for UL channel estimation (and/or configured for UL channel estimation and positioning and/or used for UL channel estimation and positioning). According to various embodiments, the positioning SRS may also be referred to as an SRS for positioning. In the description of various embodiments, terms such as a positioning SRS, an SRS for positioning, or the like may be interchangeably used, and may be understood as the same meaning. According to various embodiments, the normal SRS may also be referred to as a legacy SRS, an MIMO SRS, an SRS for MIMO, or the like. In the description of various embodiments, terms such as a normal SRS, a legacy SRS, an MIMO SRS, an SRS for MIMO and the like may be interchangeably used and understood to have the same meaning. For example, the normal SRS and the positioning SRS may be configured/indicated separately. For example, the normal SRS and the positioning SRS may be configured/directed from different Information Elements (IEs) of an upper layer, respectively. For example, the normal SRS may be configured based on an SRS-resource. For example, the positioning SRS may be configured based on an SRS-PosResource.

In the description of various embodiments, the expression 'greater than/above A' may be replaced with the expression 'above/greater than A'.

In the description of various embodiments, the expression 'less than/below B' may be replaced with the expression 'below/less than B'.

Unless particularly mentioned otherwise, in the description of various embodiments, a cell/base station (cell/BS) may be replaced with an MCG, and the MCG may be replaced with a cell/base station (cell/BS). For example, a source cell/base station (cell/BS) may be replaced with a source MCG, and a target cell/base station (cell/BS) may be replaced with a target MCG.

Hereinafter, various embodiments will be described in detail. It may be understood by those of ordinary skill in the art that the various embodiments described below may be combined in whole or in part to implement other embodiments unless mutually exclusive.

Figure 10:
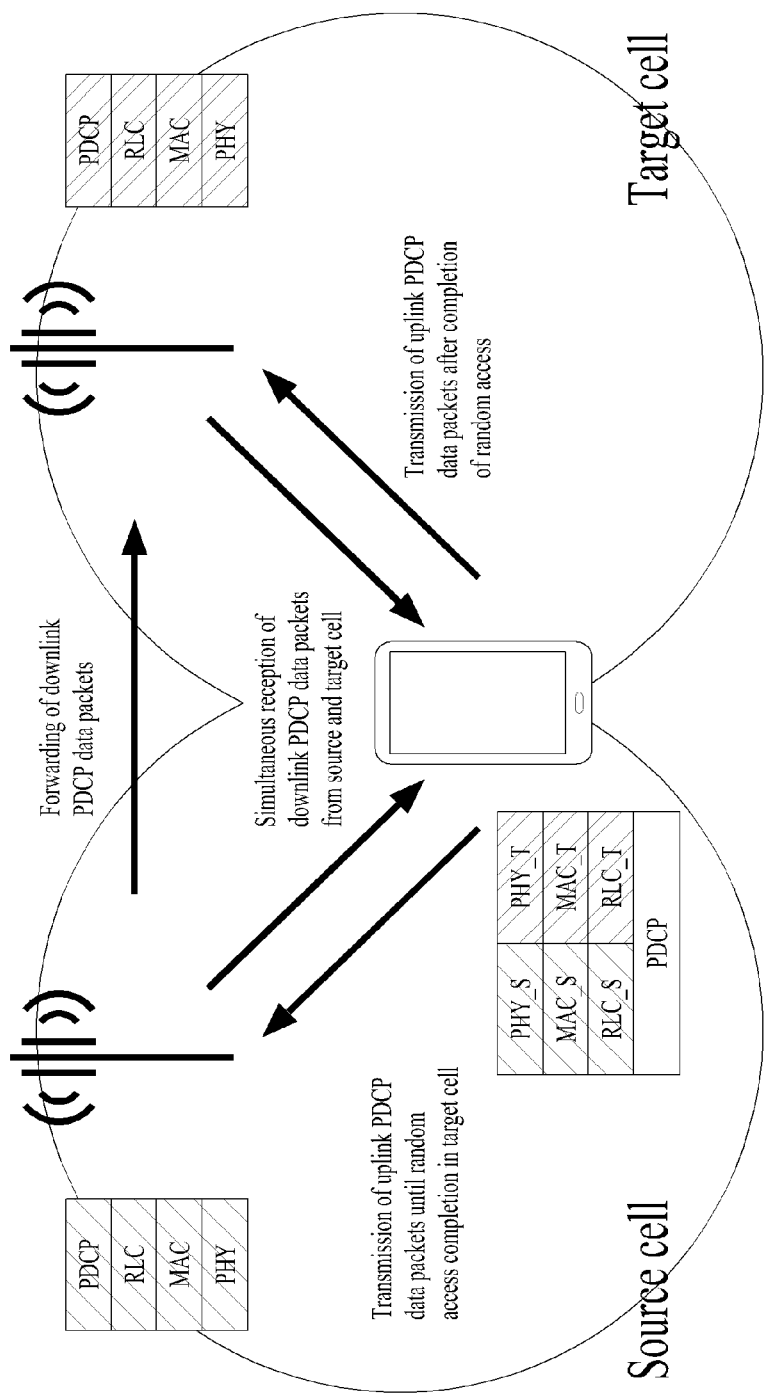
FIG. 10 is a diagram showing one example of a DAPS HO operation to which various embodiments are applicable.

FIG. 10 is a diagram showing one example of a DAPS HO operation to which various embodiments are applicable.

Referring to FIG. 10, in a wireless communication system to which various embodiments are applicable, a DAPS HO may refer to a handover that maintains a connection to a source cell/BS until a source cell is released after a success in a random access to a target cell/BS even after having received an RRC message (e.g., a HO command, etc.) for a handover.

In a wireless communication system (e.g., NR system) to which various embodiments are applicable, a DAPS HO may be supported to reduce latency of a handover. For example, in case of a general HO, there may be a time in which data is not transmitted/received. For example, the time in which data is not transmitted or received may vary depending on a scenario of a handover, but it may take 30 to 60 ms. In a wireless communication system to which various embodiments are applicable, a DAPS HO may be adopted to minimize the corresponding time (i.e., the time in which data is not transmitted or received) as much as possible.

For example, if a general HO is performed due to poor channel conditions, a UE may release connection to an existing cell (e.g., a source cell), perform a connection to a target cell (to which the UE will hand over), and then transmit data. For example, a DAPS HO may be supported to simplify the latency accordingly. For example, the features of the DAPS HO may be as follows.

1) Continuous data packet transmission and reception from a source cell after HO request 2) Simultaneous data transmissions and receptions with a source cell and a target cell 3) Data transmission and reception after a random access to a target cell For example, even before a UE completes an HO to a target cell, the UE may transmit and receive data with a source cell, and at the same time, the UE may perform a random access procedure to the target cell to reduce a corresponding time (e.g., a time in which data are not transmitted/received).

For example, to support a DAPS HO, the UE may maintain a dual stack in an active state. For example, the UE may have one user plane protocol stack for a target cell, including a Physical (PHY) layer, a Medium Access Control (MAC) layer, and a Radio Link Control (RLC) layer (including PHY_S, MAC_S, and RLC_S), while maintaining another user plane stack (including PHY_T, MAC_T, and RLC_T) for transmission/reception of user data in the source cell.

For example, the UE may simultaneously transmit and receive user data from the source cell and the target cell. For example, a Packet Data Convergence Protocol (PDCP) layer may be reconfigured as a common PDCP entity (entity) for source and target user plane protocol stacks.

For example, the UE may transmit a UL PDCP data packet to the source cell until completing a random access to the target cell.

For example, the UE may transmit a UL PDCP data packet to the target cell after completion of the random access to the target cell.

For example, the UE may simultaneously transmit/receive DL PDCH data packets from the source cell and the target cell.

Figure 11:
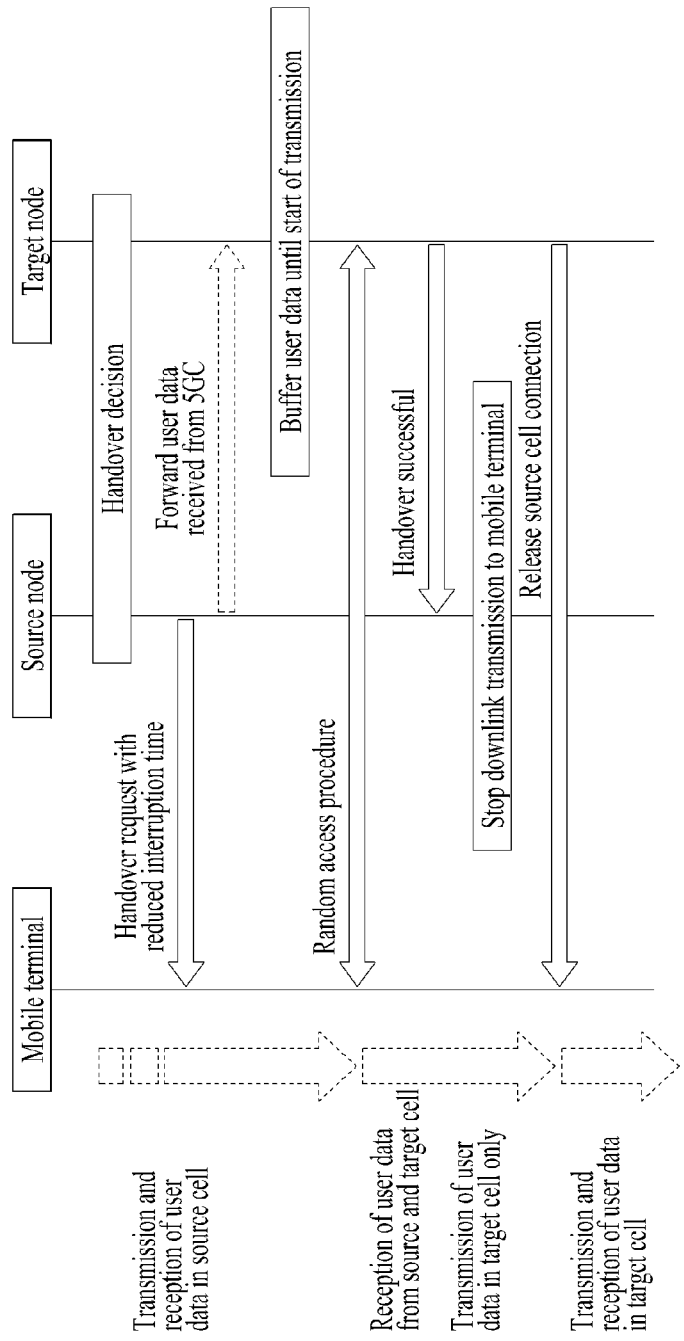
FIG. 11 is a diagram showing one example of a DAPS HO operation to which various embodiments are applicable.

For example, the PDCP data packet may be forwarded to the target cell from the source cell FIG. 11 is a diagram showing one example of a DAPS HO operation to which various embodiments are applicable.

Referring to FIG. 11, for example, when an HO decision is made between a source node (source cell/source BS) and a target node (target cell/target BS), the source node may transmit an HO request with a reduced interruption time to a UE. And/or, for example, the source node may forward user data received from a 5G Core (5G) to the target node, and the target node may buffer user data until the start of transmission. Thereafter, for example, a random access procedure between the UE and the target node may be performed. Thereafter, the target node may inform the source node of an HO success. For example, the source node may stop a DL transmission to the UE, and the target node may request the UE to release the source cell connection. For example, the UE may release the source cell connection.

For example, during a DAPS HO operation, the UE may transmit and receive user data with the source cell until a random access procedure is performed. For example, during the DAPS HO operation, the UE may receive user data from the source cell and the target cell and transmit user data to the target cell from the timing of performing the random access procedure until the timing of the source cell connection release. For example, after the source cell connection release, the UE may transmit and receive user data with the target cell.

For more specific details of the DAPS HO operation according to various embodiments, Table 11 may be referred to.

TABLE 11

15 Dual active protocol stack based handover

If a UE indicates a capability for dual active protocol stack based handover (DAPS HO), the UE can be provided with a source MCG and a target MCG.
If a UE is configured with a target MCG using NR radio access in FR1 or in FR2 and with a source MCG using NR radio access in FR2 or in FR1, respectively, the UE performs transmission power control independently per cell group as described in Clauses 7.1 through 7.5.
If a UE is configured with a target MCG using NR radio access in FR1 and a source MCG using NR radio access in FR1, the UE is configured a maximum power $P_{MCG}$ for transmissions on the target MCG by p-DAPS-Target and a maximum power $P_{SCG}$ for transmissions on the source MCG by p-DAPS-Source and with an inter-CG power sharing mode by uplinkPowerSharingDAPS-Mode. The UE determines a transmission power on the target MCG and a transmission power on the source MCG per frequency range.
If the UE indicates support for semi-static power sharing mode1 and is provided uplinkPowerSharingDAPS-Mode = Semi-static-mode1, the UE determines a transmission power for the target MCG or for the source MCG as described in Clause 7.6.2 for nrdc-PCmode-FR1 = Semi-static-mode1 by considering the target MCG as the MCG and the source MCG as the SCG.
If the UE indicates support for semi-static power sharing mode2 and is provided uplinkPowerSharingDAPS-Mode = Semi-static-mode2, the UE determines a transmission power for the target MCG or for the source SCG as described in Clause 7.6.2 for nrdc-PCmode-FR1 = Semi-static-mode2 by considering the target MCG as the MCG and the source MCG as the SCG. The UE expects to be provided uplinkPowerSharingDAPS-Mode = Semi-static-mode2 only for synchronous DAPS HO operation [10, TS 38.133].
If the UE indicates support for dynamic power sharing and is provided uplinkPowerSharingDAPS-Mode = Dynamic, the UE determines a transmission power for the target MCG or for the source MCG as described in Clause 7.6.2 for nrdc-PCmode-FR1 = Dynamic by considering the target MCG as the MCG and the source MCG as the SCG.
Intra-frequency DAPS handover is described in Clause 6.1.3.2 of [10, TS38.133].
For DAPS handover that is not intra-frequency, if
- the UE does not indicate support of ul-TransCancellationDAPS, and
- UE does not indicate a capability for power sharing between source and target MCG in DAPS handover or the UE is not provided with uplinkPowerSharingDAPS-Mode,
the UE does not expect transmissions on the target and source cell in overlapping time resources.
  For DAPS handover that is not intra-frequency, if
- the UE indicates support of ul-TransCancellationDAPS, and
- UE does not indicate a capability for power sharing between source and target MCG in DAPS handover or the UE is not provided with uplinkPowerSharingDAPS-Mode, and
- UE transmissions on the target cell and the source cell are in overlapping time resources,
the UE transmits only on the target cell, and cancels the transmission to source cell
  For intra-frequency DAPS handover, if
- UE transmissions on the target cell and the source ceil are in overlapping time resources,
the UE transmits only on the target cell and cancels the transmission on the source cell
The UE does not expect to cancel a transmission on the source cell if a first symbol of the transmission on the source cell is less than $T_{proc,2}$ + d after a last symbol of a CORESET where the UE receives a PDCCH providing a DCI format scheduling a transmission on the target cell. $T_{proc,2}$ is the PUSCH preparation time for the corresponding PUSCH processing capability [6, TS 38.214] assuming $d_{2,1}$ = 1, d is a time duration corresponding to 2 symbols for SCS configuration μ, and μ is the smallest SCS configuration between the SCS configuration of the PDCCH providing the DCI format and the SCS configuration for the transmission on the source cell. If the UE transmits PRACH using 1.25 kHz or 5 kHz SCS on the source cell, the UE determines $T_{proc,2}$ assuming SCS configuration μ = 0.
A UE does not expect to cancel a transmission on the source cell if the first symbol of the source cell transmission occurs, relative to a last symbol of a PDSCH reception conveying a RAR message with a RAR TABLE 11-continued 15 Dual active protocol stack based handover UL grant on the target cell, after a number of symbols that is smaller than $N_{T,1} + N_{T,2} +0.5$ msec, where $N_{T,1}$ is a time duration of $N_1$ symbols corresponding to a PDSCH processing time for UE processing capability 1 when additional PDSCH DM-RS is configured, $N_{T,2}$ is a time duration of $N_2$ symbols corresponding to a PUSCH preparation time for UE processing capability 1 [6, TS 38.214] and the UE considers that $N_1$ and $N_2$ correspond to the smaller of the SCS configurations for the PDSCH on the target cell and the transmission on the source cell. For $\mu = 0$, the UE assumes $N_{1,0} = 14$ [6, TS 38.214].
For intra-frequency DAPS handover operation, the UE expects that an active DL BWP and an active UL BWP on the target cell are within an active DL BWP and an active UL BWP on the source cell, respectively. If a UE is provided search space sets on both the target MCG and the source MCG, in any slot the UE does not expect to have USS sets on both the target MCG and the source MCG that result in the number of monitored PDCCH candidates and the total number of non-overlapped CCEs in both cells that each exceed tine corresponding maximum numbers per slot defined in Table 10.1-2 and Table 10.1-3.
For DAPS operation in a same frequency band, a UE does not transmit PUSCH/PUCCH/SRS to the source MCG in a slot overlapping in time with a PRACH transmission to the target MCG or when a gap between a first or last symbol of a PRACH transmission to the target MCG in a first slot would be separated by less than N symbols from a last or first symbol, respectively, of the PUSCH/PUCCH/SRS transmission to the source MCG in a second slot. For DAPS operation in a same frequency band, a UE does not transmit PRACH on the source MCG in a slot overlapping in time with a PUSCH/PUCCH/SRS transmission on the target MCG or when a gap between the first or last symbol of a PUSCH/PUCCH/SRS transmission on the target MCG is separated by less than N symbols from a last or a first symbol, respectively, of a PRACH transmission on the source MCG. N = 2 for $\mu = 0$ or $\mu = 1$, N = 4 for $\mu = 2$ or $\mu = 3$, and $\mu$ is the SCS configuration of the active UL BWP for the PUSCH/PUCCH/SRS transmission. The PUSCH processing capability is the processing capability of source cell.

For example, during a DAPS HO, the UE may perform a random access procedure to the target cell and transmit other UL signals (e.g., PUCCH, PUSCH, SRS, etc.) to the source cell. For example, since signals and/or data should be transmitted from the UE to a specific cell within the same timing point and the same frequency band (e.g., intra-band Carrier Aggregation (CA)), a priority may be required. Various embodiments may be related to this.

And/or, for example, if random access procedures with different UL signals (e.g., PUCCH, PUSCH, SRS, etc.) are performed simultaneously in different frequency bands (e.g., inter-band CA), respectively, sequential power allocation (based on priority) may be required due to the UE's limited transmit power. Various embodiments may be related to this.

When the UE uses a type-2 random access procedure (e.g., a 2-step random access procedure) instead of a type-1 random access procedure (e.g., a 4-step random access procedure) in performing a DAPS HO, various embodiments may be related to issues and/or prioritization rules that may occur due to the simultaneous transmissions of a message A and other UL signal (e.g., Physical Uplink Control Channel (PUCCH), normal physical uplink shared channel (PUSCH) (e.g., normal PUSCH that is not the PUSCH included in the message A, legacy PUSCH), Sounding Reference Signal (SRS), etc. and/or the UE's limited transmit power. Case 1 and/or Case 2 according to various embodiments described below may be separately performed and/or may configure one combined embodiment. For example, if a DAPS HO is performed on the same frequency band, it may depend on case 1. If a DAPS HO is performed on a different frequency band, it may depend on Case 2.

Case1: Simultaneous Transmission Between msgA and Other UL Signal (e.g. Pucch, SRS, Pusch)

According to various embodiments, in the case of a DAPS HO, a UE may transmit a UL signal to the source cell until the handover procedure is completed. However, according to various embodiments, the UE may perform/proceed the random access procedure to a target cell during the corresponding handover.

According to various embodiments, a normal RACH procedure may have a higher priority than transmission of other UL signal (e.g., PUCCH, SRS, PUSCH, etc.). According to various embodiments, the higher priority of the RACH procedure than the other UL signal transmission may mean that a priority of a signal transmitted and received in the RACH procedure is higher than that of transmission of other UL signal.

According to various embodiments, when a DAPS HO is executed/performed within the same frequency band, PRACH transmission may be preferentially performed. According to various embodiments, transmission of other UL signal (e.g., PUCCH, SRS, PUSCH, etc.) may be possible only when a predetermined time difference (e.g., N symbols) exists after the PRACH transmission.

According to various embodiments, if an RACH procedure performed in a DAPS HO is the type-2 random access procedure, the relationship between the transmission of a message A and the transmission of other UL signal (e.g., PUCCH, SRS, PUSCH, etc.) may be defined/defined.

According to various embodiments, when a UE performs a DAPS HO, whether to perform a type-1 random access procedure or a type-2 random access procedure may be directly configured/indicated by a BS in system information and/or handover request information in a manner of including whether to perform a random access procedure. For example, whether to perform a random access procedure and/or a type of the random access procedure to be performed may be configured/indicated in the system information and/or the handover request.

According to various embodiments, since a handover procedure is prioritized, a message-A preamble (e.g., a PRACH/PRACH preamble included in a message A) may be prioritized over transmission of other UL signal (e.g., PUCCH, SRS, PUSCH, etc.). According to various embodiments, if a transmission of a message-A preamble and a transmission of other UL signal (e.g., PUCCH, SRS, PUSCH, etc.) overlap each other at the same timing point, a UE may transmit the message-A preamble and be then able to make transmission of other UL signal (e.g., PUCCH, SRS, PUSCH, etc.) only if there is a predetermined time difference (e.g., N symbols) after the message-A preamble transmission.

According to various embodiments, a message-A PUSCH (i.e., PUSCH included in a message A) may have the same priority as a preamble. According to various embodiments, considering that the purpose of the type-2 random access procedure is latency reduction, a message-A PUSCH transmission to a target cell may have the same priority as a message-A PRACH transmission to the target cell. According to various embodiments, the message-A PUSCH transmission to the target cell may have a higher priority than the transmission of other UL signal (e.g., PUCCH, SRS, PUSCH, etc.) to a source cell. According to various embodiments, the message-A PUSCH transmission to the target cell has a higher priority than other UL signal (e.g., PUCCH, SRS, PUSCH, etc.) to the source cell, so if a DAPS HO occurs/is performed on the same frequency band, the transmission of other UL signal (e.g., PUCCH, SRS, PUSCH, etc.) from the UE to the source cell may not be performed in the same slot when the message-A PUSCH is transmitted to the target cell. According to various embodiments, the transmission of other UL signal (e.g., PUCCH, SRS, PUSCH, etc.) may be possible only when there is a predetermined time difference (e.g., N symbols) from the symbol in which transmission of the message-A PUSCH ends.

Figure 12:
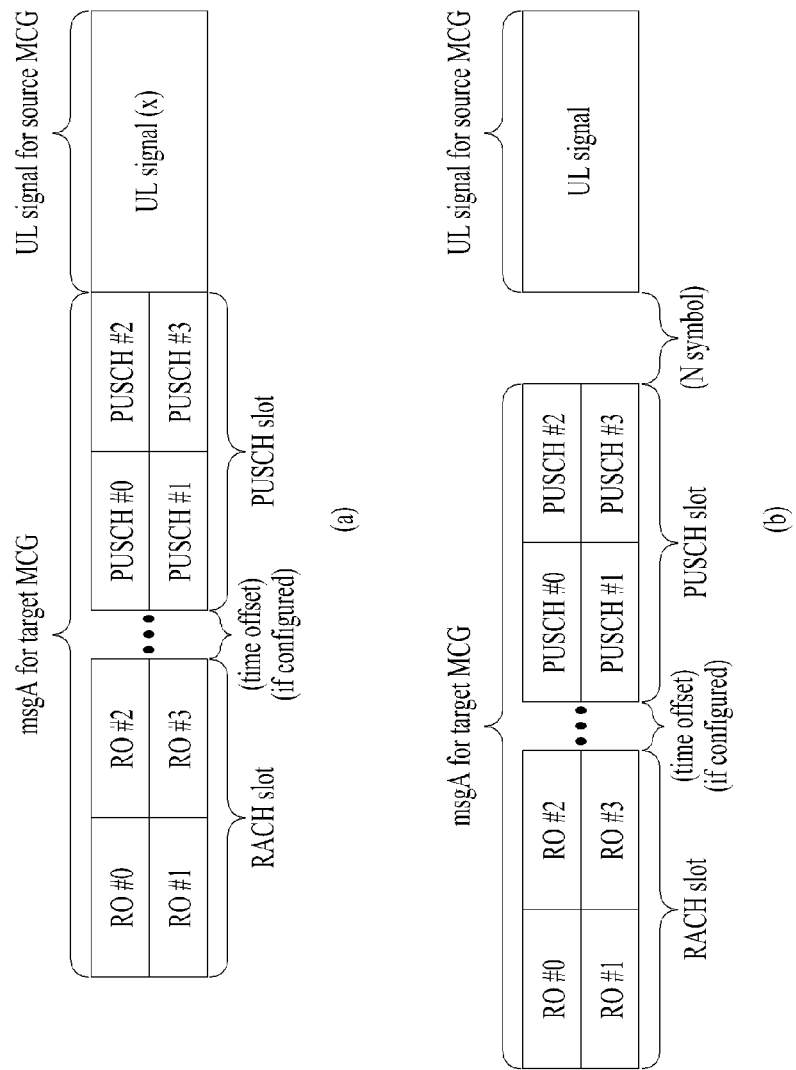
FIG. 12 is a diagram showing one example of a transmission structure according to various embodiments.

FIG. 12 is a diagram showing one example of a transmission structure according to various embodiments.

Referring to FIG. 12, a PRACH occasion (i.e., occasion/RACH Occasion (RO)) and/or a PUSCH occasion opportunity for a message A may be multiplexed in various ways. For example, FIG. 12 illustrates an example in which a PRACH occasion and/or a PUSCH occasion for a message A is FDMed/TDMed, by which various embodiments are non-limited. For example, the PRACH occasion may be FDMed and/or TDMed, and/or the PUSCH occasion may be FDMed and/or TDMed.

For example, RO may be included or mapped in an RACH slot located ahead of a PUSCH slot in a time domain. For example, a PUSCH occasion may be included or mapped in a PUSCH slot located behind an RACH slot in a time domain.

For example, a predetermined time offset may be set between an RO and a PUSCH occasion in a time domain That is, for example, a predetermined time offset may be set between an RACH slot containing an RO and a PUSCH slot containing a PUSCH occasion in the time domain.

For example, the corresponding time offset may include a predetermined number of slots.

As a counter example, when the corresponding time offset is not set, the RACH slot and the PUSCH slot may be consecutive in the time domain.

Referring to FIG. 12(a), for example, if at least one portion of a time interval in which a message A for a target MCG (i.e., to be sent to the target MCG) is mapped overlaps with at least one portion of a time interval in which a UL signal for a source MCG (i.e., to be sent to the source MCG) is mapped, the UL signal may not be transmitted.

Referring to FIG. 12(b), for example, if a time interval in which a UL signal for a source MCG (i.e., to be sent to the source MCG) is mapped after N symbols is configured in a time interval in which a message A for a target MCG (i.e., to be sent to the target MCG) is mapped, the UL signal may be transmitted.

FIG. 12(a) and FIG. 12(b) have illustrated a case where the N symbols are configured/indicated from the last occasion among the PUSCH occasions, by which various embodiments are non-limited. For example, N symbols may be configured from a PUSCH occasion in which a message-A PUSCH is transmitted actually. For example, when a message-A PUSCH is transmitted on a PUSCH occasion #0, a UL signal for a source MCG may be transmitted after N symbols from the last symbol of the PUSCH occasion #0.

Case 2: Power Prioritization Rule Between msgA and Other UL Signal (e.g. Pucch, SRS, Pusch)

In case of Case 1 according to various embodiments, when a DAPS HO occurs within the same frequency band, it may be related to a priority in terms of transmission of a message A and transmission of other UL signal.

In case of Case 2 according to various embodiments, it may be related to a case that there are transmission of other signal to a source cell and transmission of a message A to a target cell on different frequency bands instead of the same frequency band and at the same timing point.

For example, when there are transmission of other signal to a source cell and transmission of a message A to a target cell on different frequency bands instead of the same frequency band and at the same timing point, due to the limited maximum transmit power of a UE, the UE may have to transmit each signal/data by distributing transmit power. According to various embodiments, this case may be related to a method that the UE may take.

According to various embodiments, a UE may receive configuration/indication/designation of maximum transmit power common to both a source MCG and a target MCG and/or for each of them from a BS. According to various embodiments, transmit power may be sequentially distributed based on the following priority. According to various embodiments, transmit power may be allocated in the order (descending order) of high-priority UL transmission to low-priority UL transmission according to determined priorities. For example, when the total UE transmit power for UL signal transmission, including PUSCH and/or PUCCH and/or PRACH and/or SRS transmission in serving cells within the Frequency Range (FR) on each transmission occasion, exceeds a preconfigured/defined maximum UE transmit power (i.e., maximum transmit power on a transmission occasion), transmit power may be allocated based on priorities.

[Priority]

1) Message-A preamble to target MCG (message-A PRACH)

2) PUCCH containing Hybrid Automatic Report Request-ACK (HARQ-ACK) information to source MCG and/or Scheduling Request (SR) and/or Location Report Request (LRR) information 3) PUCCH containing Channel State Information (CSI) information to source MCG 4) PUSCH to source MCG (without HARQ-ACK information or CSI)

5) Transmission of SRS (e.g., aperiodic SRS may have higher priority than semi-persistent and/or periodic SRS. SRS for positioning may have the highest or lowest priority.) to source MCG and/or PRACH to cell other than target MCG According to various embodiments, in the case of message-A PUSCH, it may have a priority (i.e., between 1 and 2) next to a message-A preamble in the above-described priority and/or the same priority of PUSCH of 4). According to various embodiments, the priority including the message-A PUSCH may be as follows.

[Priority]—Example-1

1) Message-A preamble to target MCG (message-A PRACH)

2) Message-A PUSCH (to target MCG)

3) PUCCH containing Hybrid Automatic Report Request-ACK (HARQ-ACK) information to source MCG and/or Scheduling Request (SR) and/or Location Report Request (LRR) information 4) PUCCH containing Channel State Information (CSI) to source MCG 5) PUSCH to source MCG (without HARQ-ACK information or CSI)

6) Transmission of SRS (e.g., aperiodic SRS may have a higher priority than semi-persistent and/or periodic SRS. SRS for positioning may have the highest or lowest priority.) to source MCG and/or PRACH to cell other than target MCG

[Priority]—Example-2

1) Message-A preamble to target MCG (message-A PRACH)

2) PUCCH containing Hybrid Automatic Report Request-ACK (HARQ-ACK) information to source MCG and/or Scheduling Request (SR) and/or Location Report Request (LRR) information 3) PUCCH containing Channel State Information (CSI) to source MCG 4) PUSCH to source MCG (without HARQ-ACK information or CSI) or message-A PUSCH (to target MCG)

5) Transmission of SRS (e.g., aperiodic SRS may have a higher priority than semi-persistent and/or periodic SRS. SRS for positioning may have the highest or lowest priority.) to source MCG and/or PRACH to cell other than target MCG For example, if signals and/or data with the same priority are transmitted on different UL carriers, preferential power allocation may be made to the UL carriers on which PUCCH is transmitted.

According to various embodiments, when a UE performs a DAPS HO, whether to perform a type-1 random access procedure or a type-2 random access procedure may be directly configured/indicated by a BS in system information and/or handover request information in a manner of including whether to perform a random access procedure. For example, whether to perform a random access procedure and/or a type of the random access procedure to be performed may be configured/indicated in the system information and/or the handover request.

Figure 13:
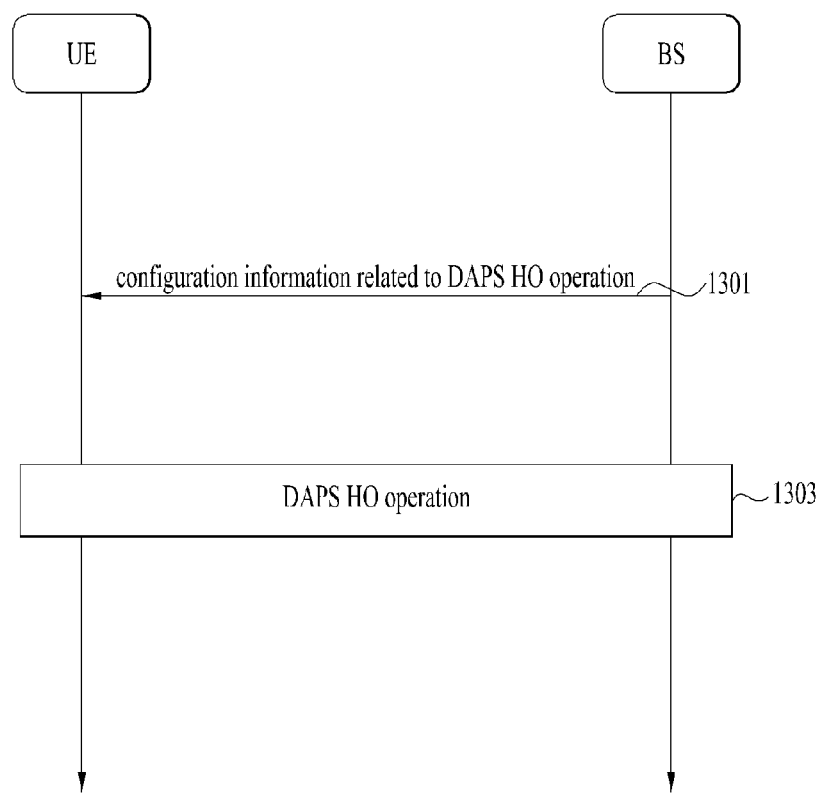
FIG. 13 is a diagram schematically showing a method of operating a UE and BS according to various embodiments.

FIG. 13 is a diagram schematically showing a method of operating a UE and BS according to various embodiments.

Figure 14:
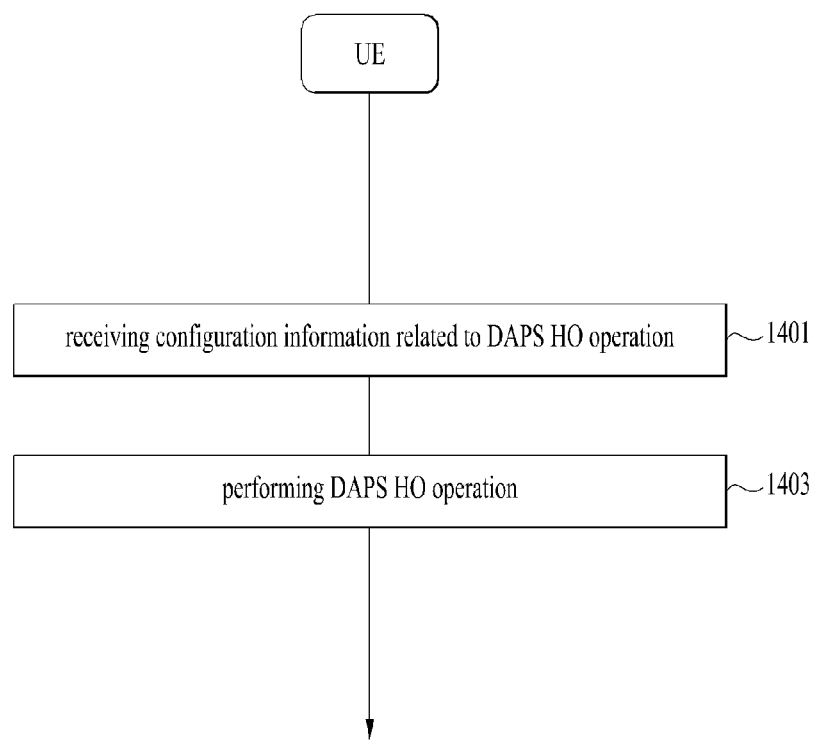
FIG. 14 is a flowchart showing a method of operating a UE according to various embodiments.

FIG. 14 is a flowchart showing a method of operating a UE according to various embodiments.

Figure 15:
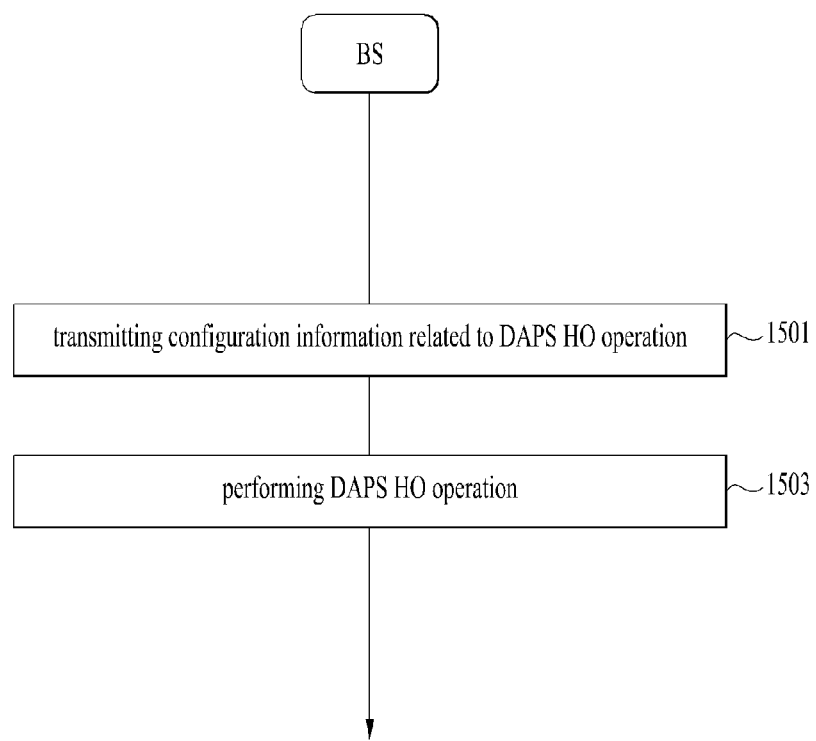
FIG. 15 is a flowchart showing a method of operating a BS according to various embodiments.

FIG. 15 is a flowchart showing a method of operating a BS according to various embodiments.

Referring to FIGS. 13 to 15, in steps 1301, 1401, and 1501 according to various embodiments, a BS may transmit configuration information related to a dual active protocol stack based handover (DAPS HO) operation, and a UE may receive it.

According to various embodiments, the UE may receive a source master cell group (MCG) and a target MCG for a DAPS HO operation.

According to various embodiments, the BS may correspond to the source MCG. For example, the BS may be a network node operating the source MCG and/or operating the source MCG and the target MCG.

In steps 1303, 1403, and 1503 according to various embodiments, the UE and/or the BS may perform the DAPS HO operation based on the configuration information.

According to various embodiments, based on the transmission of a message A containing a physical random access channel (PRACH) and a physical uplink shared channel (PUSCH) to the target MCG in the DAPS HO operation, a UL signal different from the message A may not be transmitted to the source MCG in a first time interval overlapping with a second time interval in which the PRACH and the PUSCH contained in the message A are transmitted.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments

4.1. Exemplary Configurations of Devices to Which Various Embodiments are Applied FIG. 16 is a diagram illustrating devices that implement type 2various embodiments.

The devices illustrated in FIG. 35 may be a UE and/or a BS (e.g., eNB or gNB) adapted to perform the afore-described mechanisms, or any devices performing the same operation.

Figure 16:
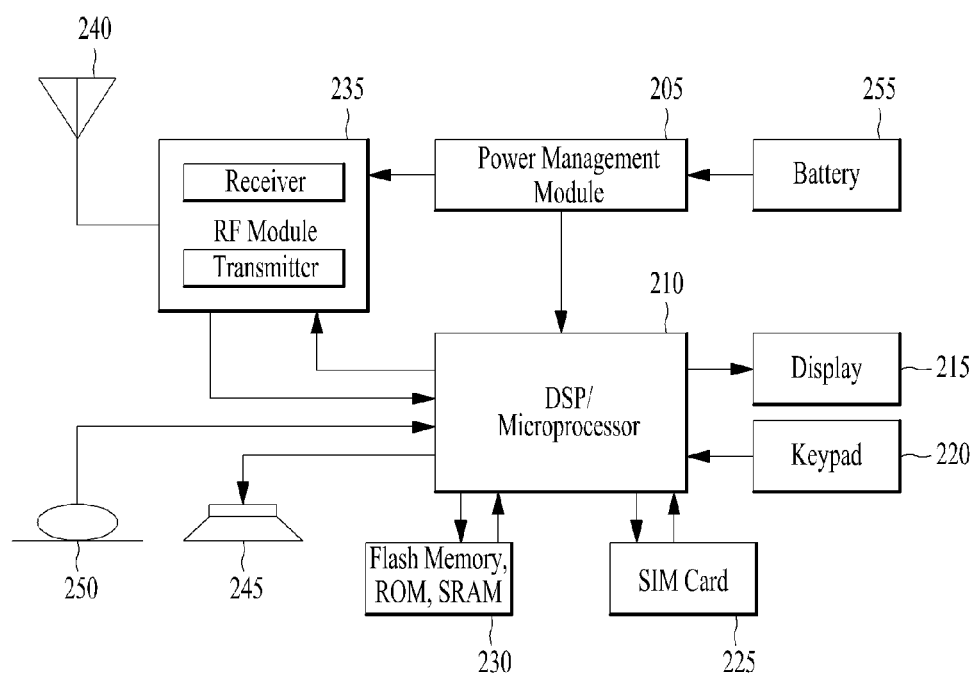
FIG. 16 is a block diagram illustrating an apparatus for implementing type 2various embodiments.

Referring to FIG. 16, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 16 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 16 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to type 2various embodiments may operate as follows, while controlling a memory.

According to type 2various embodiments, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments, one or more processors included in a user equipment (or one or more processors of a communication device included in the user equipment) may receive configuration information related to a dual active protocol stack based handover (DAPS HO) operation.

According to various embodiments, the user equipment may be provided with a source master cell group (MCG) and a target MCG for the DAPS HO operation.

According to various embodiments, the one or more processors included in the user equipment may perform the DAPS HO operation based on the configuration information.

According to various embodiments, based on transmitting a message A including a physical random access channel (PRACH) and a physical uplink shared channel (PUSCH) to the target MCG in the DAPS HO operation, an uplink signal different from the message A may not be transmitted to the source MCG in a first time interval overlapping with a second time interval in which the PRACH and PUSCH included in the message A is transmitted.

According to various embodiments, the first time interval and the second time interval may correspond to the same one slot.

According to various embodiments, information for configuring a type of a random access procedure performed in the DAPS HO operation may be received based on system information or a handover request.

According to various embodiments, based on configuring the type of the random access procedure as type 2, the message A may be transmitted to the target MCG in the random access procedure performed in the DAPS HO operation.

According to various embodiments, the uplink signal may be transmitted in a third time interval after the N symbols from a last symbol among symbols included in the first time interval.

According to various embodiments, the last symbol among the symbols included in the first time interval may include a last symbol among symbols to which the PUSCH included in the message A is mapped, and the N may be a natural number.

According to various embodiments, based on the DAPS HO operation being a DAPS HO operation within the same frequency band, the uplink signal may not be transmitted to the source MCG in the first time interval.

According to various embodiments, depending on priorities preconfigured based on the DAPS HO operation being a DAPS HO operation within a different frequency band and a result of comparing total transmit power of uplink transmissions to maximum transmit power of the UE, transmit power may be allocated to the uplink transmissions.

According to various embodiments, the uplink transmissions may include a transmission of the message A and a transmission of the uplink signal.

According to various embodiments, within the priorities, a priority of the PRACH included in the message A may be higher than a priority of the PUSCH included in the message A.

According to various embodiments, one or more processors (or one or more processors of a communication device included in a base station) may transmit configuration information related to a dual active protocol stack based handover (DAPS HO) operation.

According to various embodiments, when a source master cell group (MCG) and a target MCG are provided for the DAPS HO operation, the base station may correspond to the source MCG.

According to various embodiments, the one or more processors included in the base station may perform the DAPS HO operation based on the configuration information.

According to various embodiments, based on transmitting a message A including a physical random access channel (PRACH) and a physical uplink shared channel (PUSCH) to the target MCG in the DAPS HO operation, an uplink signal different from the message A may not be transmitted to the source MCG in a first time interval overlapping with a second time interval in which the PRACH and PUSCH included in the message A is transmitted.

A more specific operation of a processor included in a BS and/or a UE according to type 2various embodiments may be described and performed based on the afore-described clause 1 to clause 3.

Unless contradicting with each other, type 2various embodiments may be implemented in combination. For example, the BS and/or the UE according to type 2various embodiments may perform operations in combination of the embodiments of the afore-described clause 1 to clause 3, unless contradicting with each other.

4.2. Example of Communication System to which Type 2Various Embodiments are Applied In the present specification, type 2various embodiments have been mainly described in relation to data transmission and reception between a BS and a UE in a wireless communication system. However, type 2various embodiments are not limited thereto. For example, type 2various embodiments may also relate to the following technical configurations.

The various descriptions, functions, procedures, proposals, methods, and/or operational flowcharts of the type 2various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
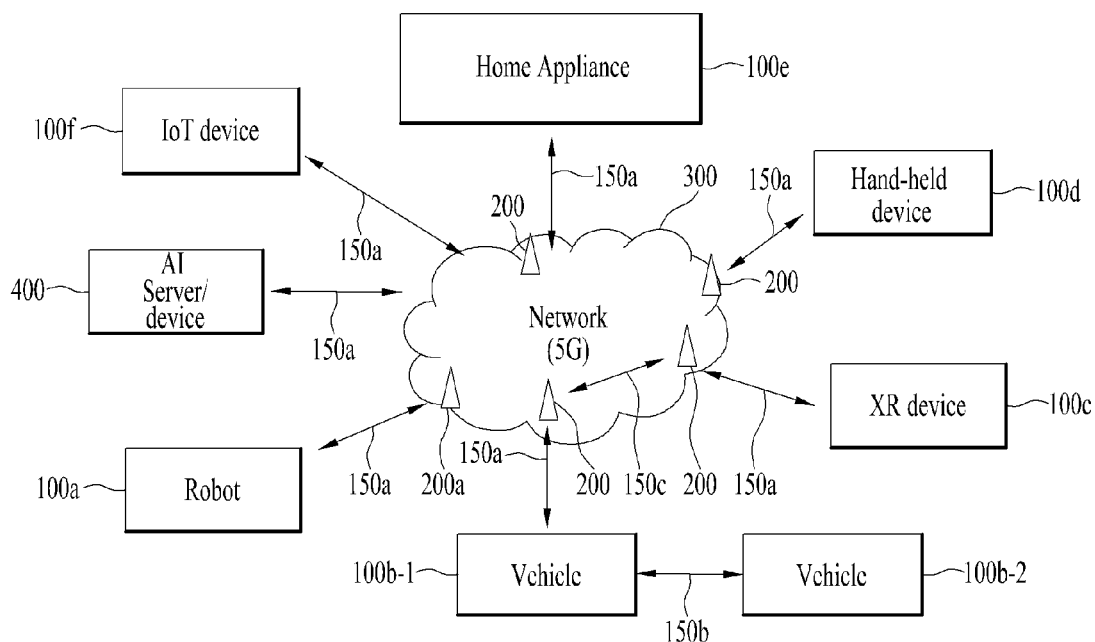
FIG. 17 is a diagram illustrating a communication system to which type 2various embodiments are applicable.

FIG. 17 illustrates an exemplary communication system to which type 2various embodiments are applied.

Referring to FIG. 17, a communication system 1 applied to the type 2various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR)

device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the type 2various embodiments.

Figure 18:
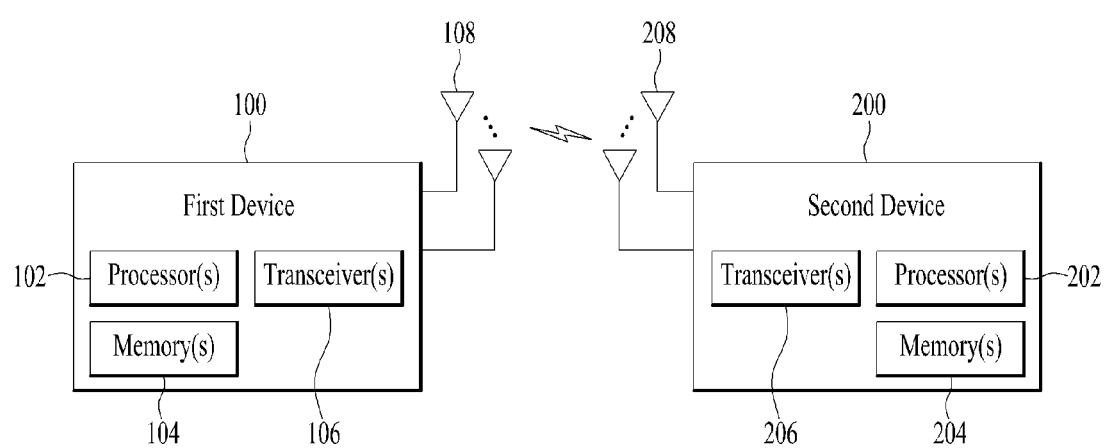
FIG. 18 is a block diagram illustrating wireless devices to which type 2various embodiments are applicable.

4.2.1 Example of Wireless Devices to which Type 2Various Embodiments are Applied FIG. 18 illustrates exemplary wireless devices to which type 2various embodiments are applicable.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the type 2various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the type 2various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to type 2various embodiments, one or more memories (e.g., 104 or 204) may store instructions or programs which, when executed, cause one or more processors operably coupled to the one or more memories to perform operations according to various embodiments or implementations of the present disclosure.

According to type 2various embodiments, a computer-readable storage medium may store one or more instructions or computer programs which, when executed by one or more processors, cause the one or more processors to perform operations according to various embodiments or implementations of the present disclosure.

According to type 2various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 19:
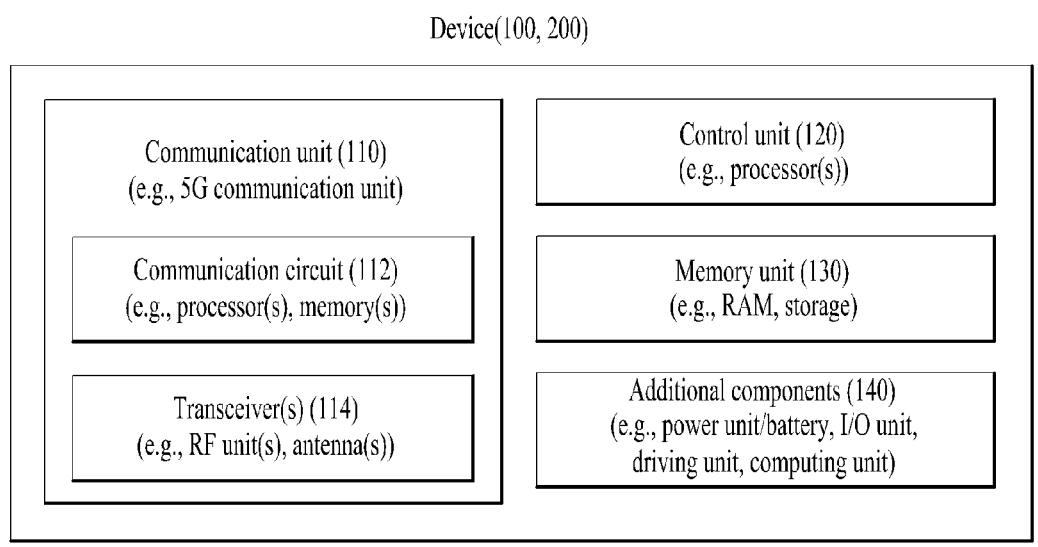
FIG. 19 is a block diagram illustrating another example of wireless devices to which type 2various embodiments are applicable.

4.2.2. Example of Using Wireless Devices to which Type 2Various Embodiments are Applied FIG. 19 illustrates other exemplary wireless devices to which type 2various embodiments are applied. The wireless devices may be implemented in various forms according to a use case/service (see FIG. 17).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
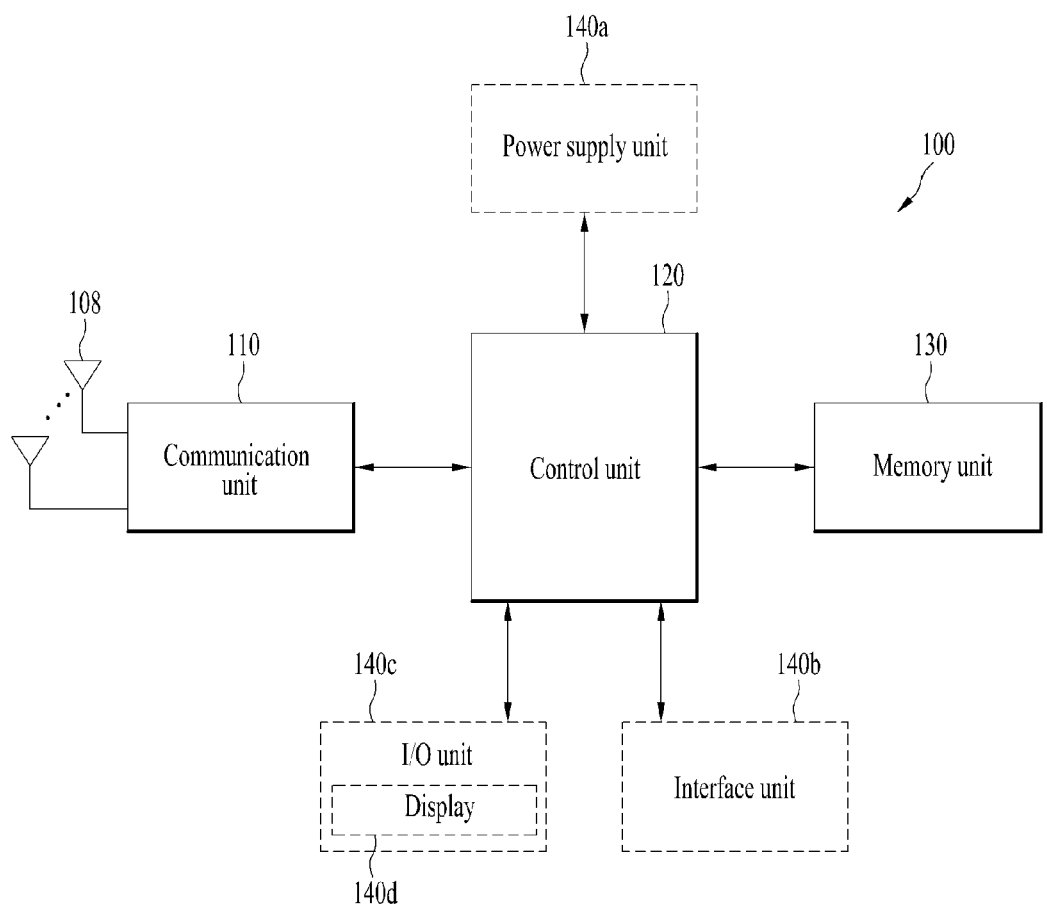
FIG. 20 is a block diagram illustrating a portable device applied to type 2various embodiments.

4.2.3. Example of Portable Device to which Type 2Various Embodiments are Applied FIG. 20 illustrates an exemplary portable device to which type 2various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
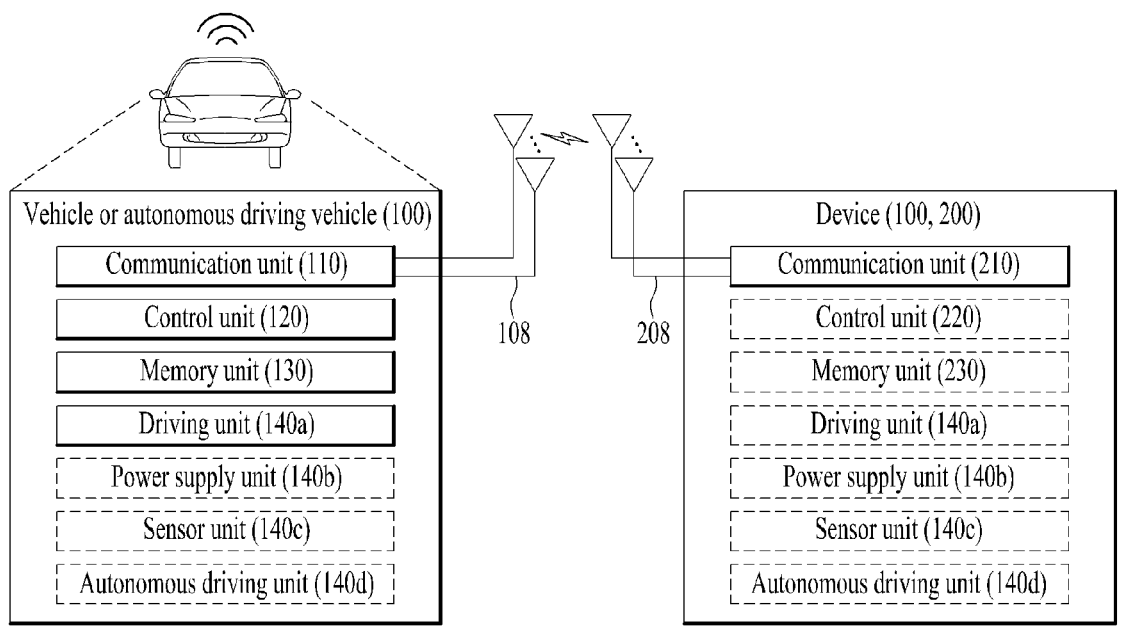
FIG. 21 is a block diagram illustrating a vehicle or an autonomous driving vehicle, which is applied to type 2various embodiments.

4.2.4. Example of Vehicle or Autonomous Driving Vehicle to which Type 2Various Embodiments FIG. 21 illustrates an exemplary vehicle or autonomous driving vehicle to which type 2various embodiments. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, type 2various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments of the present disclosure may be implemented in various means. For example, type 2various embodiments may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the type 2various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the type 2various embodiments may be carried out in other specific ways than those set forth herein without departing from the spirit and essential characteristics of the type 2various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems including a 3GPP system, and/or a 3GPP2 system. Besides these wireless access systems, the type 2various embodiments are applicable to all technical fields in which the wireless access systems find their applications. Moreover, the proposed method can also be applied to mmWave communication using an ultra-high frequency band.

What is claimed is:

1. A method performed by a user equipment (UE), the method comprising:
 receiving configuration information related to a dual active protocol stack based handover (DAPS HO) operation; and
 performing the DAPS HO operation based on the configuration information,
 wherein performing the DAPS HO operation comprises:
 performing a transmission of a message A, which includes a physical random access channel (PRACH) and a physical uplink shared channel (PUSCH), on a target cell included in a target master cell group (MCG) for the DAPS HO operation, and
 wherein, based on i) the transmission of the message A on the target cell overlapping in time with an uplink transmission on a source cell included in a source MCG for the DAPS HO operation and ii) the source cell and the target cell being within different frequency bands, the method further comprises:
 determining a transmission power for the transmission of the message A on target cell and a transmission power for the uplink transmission on the source cell based on preconfigured priorities within a maximum transmit power of the UE, and
 wherein the PRACH included in the message A has a higher priority than a priority of the PUSCH included in the message A.

2. The method of claim 1, wherein, based on the uplink transmission on the source cell being in a time interval N symbols after a last symbol among symbols to which the PUSCH included in the message A is mapped, where N is a natural number, performing the DAPS HO operation further comprises:
 performing the uplink transmission on the source cell.

3. The method of claim 1, wherein based on i) the transmission of the message A on the target cell overlapping in time with the uplink transmission on the source cell and ii) the source cell and the target cell being within a same frequency band, performing the DAPS HO operation further comprises:
 cancelling the uplink transmission on the source cell.

4. The method of claim 1, further comprising:
 receiving information to configure a type of a random access procedure performed in the DAPS HO operation,
 wherein, based on the type of the random access procedure being configured as type 2, the DAPS HO operation comprises performing the transmission of the message A on the target cell.

5. A user equipment (UE), the UE comprising:
 a transceiver;
 at least one processor coupled with the transceiver; and
 at least one memory storing instructions that cause the at least one processor to perform operations comprising:
 receiving configuration information related to a dual active protocol stack based handover (DAPS HO) operation; and
 performing the DAPS HO operation based on the configuration information,
 wherein performing the DAPS HO operation comprises:
 performing a transmission of a message A, which includes a physical random access channel (PRACH) and a physical uplink shared channel (PUSCH), on a target cell included in a target master cell group (MCG) in for the DAPS HO operation,
 wherein, based on i) the transmission of the message A on the target cell overlapping in time with an uplink transmission on a source cell included in a source MCG for the DAPS HO operation and ii) the source cell and the target cell being within different frequency bands, the operations further comprise:
 determining a transmission power for the transmission of the message A on target cell and a transmission power for the uplink transmission on the source cell based on preconfigured priorities within a maximum transmit power of the UE, and
 wherein the PRACH included in the message A has a higher priority than a priority of the PUSCH included in the message A.

6. The UE of claim 5, wherein, based on the uplink transmission on the source cell being in a time interval N symbols after a last symbol among symbols to which the PUSCH included in the message A is mapped, where N is a natural number, performing the DAPS HO operation further comprises:
 performing the uplink transmission on the source cell.

7. The UE of claim 5, wherein the operations further comprise:
 receiving information to configure a type of a random access procedure performed in the DAPS HO operation,
 wherein, based on the type of the random access procedure being configured as type 2, the DAPS HO operation comprises performing the transmission of the message A on the target cell.

8. A base station comprising:
 a transceiver;
 at least one processor coupled with the transceiver; and
 at least one memory storing instructions that cause the at least one processor to perform operations comprising:
 transmitting configuration information related to a dual active protocol stack based handover (DAPS HO) operation; and performing the DAPS HO operation with a user equipment (UE) based on the configuration information, wherein performing the DAPS HO operation with the UE comprises:

receiving a transmission of a message A, which includes a physical random access channel (PRACH) and a physical uplink shared channel (PUSCH), on a target cell included in a target master cell group (MCG) for the DAPS HO operation, wherein, based on i) the transmission of the message A on the target cell overlapping in time with an uplink transmission on a source cell included in a source MCG for the DAPS HO operation and ii) the source cell and the target cell being within different frequency bands, a transmission power for the transmission of the message A on target cell and a transmission power for the uplink transmission on the source cell are determined at the UE based on preconfigured priorities within a maximum transmit power of the UE, and wherein the PRACH included in the message A has a higher priority than a priority of the PUSCH included in the message A.

* * * * *